United States Patent
Muta et al.

(10) Patent No.: US 11,043,129 B2
(45) Date of Patent: Jun. 22, 2021

(54) MOBILE OBJECT SYSTEM AND CONTROL METHOD FOR MOBILE OBJECT SYSTEM

(71) Applicant: TOYOTA JIDOSHA KABUSHIKI KAISHA, Toyota (JP)

(72) Inventors: Takahiro Muta, Mishima (JP); Eisuke Ando, Nagoya (JP); Takao Hishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/222,082

(22) Filed: Dec. 17, 2018

(65) Prior Publication Data

US 2019/0197904 A1 Jun. 27, 2019

(30) Foreign Application Priority Data

Dec. 27, 2017 (JP) .............................. JP2017-252156

(51) Int. Cl.
*G08G 1/00* (2006.01)
*H04W 4/44* (2018.01)
*G05D 1/00* (2006.01)

(52) U.S. Cl.
CPC ........... *G08G 1/202* (2013.01); *G05D 1/0088* (2013.01); *H04W 4/44* (2018.02)

(58) Field of Classification Search
CPC ...... G08G 1/202; G05D 1/0088; G05D 1/024; G05D 1/0246; G05D 1/0255; G05D 1/0274; G05D 1/0297; G05D 2201/0211; G05D 2201/0216; G05D 1/0251; G05D 1/0257; G05D 1/0223; G05D 1/0214; G05D 1/0278; G05D 1/0285; G05D 2201/02; H04W 4/44; G06Q 10/063114; G06Q 30/0621; G06Q 10/083; G06Q 50/28; G06Q 50/30; Y10S 901/01; F16L 58/08; E04B 1/26;

(Continued)

(56) References Cited

U.S. PATENT DOCUMENTS

| 4,428,708 A | * | 1/1984 | Burt ..................... B65G 1/0421 |
| | | | 414/275 |
| 5,903,464 A | * | 5/1999 | Stingel, Jr. ........... B65G 1/1378 |
| | | | 700/215 |

(Continued)

FOREIGN PATENT DOCUMENTS

| JP | 9-183334 | 7/1997 |
| JP | 2015-092320 A | 5/2015 |

*Primary Examiner* — Bhavesh V Amin
(74) *Attorney, Agent, or Firm* — Oblon, McClelland, Maier & Neustadt, L.L.P.

(57) ABSTRACT

A mobile object system dispatches a vehicle capable of moving autonomously to a destination at which a user is located. The system includes a controller comprising at least one processor configured to receive a request for use of a vehicle provided with first equipment, and send to the vehicle a first command to travel to a first destination designating a place where at least a part of the first equipment is present as a first stopover place. The vehicle in the mobile object system travels, in accordance with the first command to travel, from the first stopover place to the first destination after loading of at least a part of the first equipment onto the vehicle at the first stopover place is completed to complete the first equipment.

7 Claims, 16 Drawing Sheets

(58) Field of Classification Search
CPC ......... E04B 1/35; E04G 21/16; E04G 21/167; E04G 21/168; E04G 21/26
See application file for complete search history.

(56) References Cited

U.S. PATENT DOCUMENTS

| | | | | |
|---|---|---|---|---|
| 6,854,583 | B1* | 2/2005 | Horn | B65G 49/064 |
| | | | | 198/346.2 |
| 6,974,928 | B2* | 12/2005 | Bloom | G07C 9/23 |
| | | | | 209/583 |
| 7,894,939 | B2* | 2/2011 | Zini | G05B 19/41895 |
| | | | | 700/245 |
| 7,991,505 | B2* | 8/2011 | Lert, Jr. | B65G 1/1378 |
| | | | | 700/214 |
| 8,594,834 | B1* | 11/2013 | Clark | G06Q 10/087 |
| | | | | 700/214 |
| 8,606,392 | B2* | 12/2013 | Wurman | G05B 19/41895 |
| | | | | 700/214 |
| 8,718,814 | B1* | 5/2014 | Clark | G06Q 10/08 |
| | | | | 700/214 |
| 8,972,045 | B1* | 3/2015 | Mountz | B65G 1/1373 |
| | | | | 700/216 |
| 9,022,208 | B2* | 5/2015 | Huber | B65G 43/00 |
| | | | | 198/781.05 |
| 9,475,649 | B2* | 10/2016 | Toebes | B65G 1/0485 |
| 9,519,882 | B2* | 12/2016 | Galluzzo | B65G 1/1373 |
| 9,563,197 | B2* | 2/2017 | Stiernagle | G05B 19/4155 |
| 9,694,977 | B2* | 7/2017 | Aprea | G06Q 10/087 |
| 9,725,241 | B2* | 8/2017 | Swinkels | B65G 1/0492 |
| 9,801,517 | B2* | 10/2017 | High | G05D 1/0297 |
| 9,889,563 | B1* | 2/2018 | Stubbs | G05D 1/0214 |
| 9,975,148 | B2* | 5/2018 | Zhu | B65G 1/1373 |
| 10,040,630 | B2* | 8/2018 | Grinnell | B65G 1/1373 |
| 10,255,582 | B2* | 4/2019 | Shydo, Jr. | G05D 1/0291 |
| 10,274,953 | B1* | 4/2019 | Agarwal | G06Q 10/087 |
| 10,399,777 | B2* | 9/2019 | Grinnell | G05D 1/0289 |
| 10,482,401 | B2* | 11/2019 | Wurman | G06Q 10/08 |
| 10,691,109 | B2* | 6/2020 | Wise | G06Q 10/087 |
| 10,703,567 | B2* | 7/2020 | Grinnell | B25J 9/1679 |
| 2008/0045274 | A1* | 2/2008 | Witkowski | G07C 5/008 |
| | | | | 455/569.2 |
| 2008/0051985 | A1* | 2/2008 | D'Andrea | G05D 1/0212 |
| | | | | 701/410 |
| 2008/0167884 | A1* | 7/2008 | Mountz | G06Q 10/0875 |
| | | | | 705/29 |
| 2009/0074545 | A1* | 3/2009 | Lert, Jr. | B65G 1/0492 |
| | | | | 414/276 |
| 2009/0185884 | A1* | 7/2009 | Wurman | B65G 1/1373 |
| | | | | 414/270 |
| 2012/0330458 | A1* | 12/2012 | Weiss | B66F 9/063 |
| | | | | 700/216 |
| 2013/0293410 | A1* | 11/2013 | Hieronimi | G01S 13/74 |
| | | | | 342/190 |
| 2013/0317642 | A1* | 11/2013 | Asaria | G06Q 10/08 |
| | | | | 700/216 |
| 2014/0046512 | A1* | 2/2014 | Villamar | G06Q 10/087 |
| | | | | 701/19 |
| 2014/0081445 | A1* | 3/2014 | Villamar | G06Q 10/087 |
| | | | | 700/216 |
| 2014/0277691 | A1* | 9/2014 | Jacobus | B66F 9/063 |
| | | | | 700/216 |
| 2015/0277440 | A1* | 10/2015 | Kimchi | G08G 5/0013 |
| | | | | 701/26 |
| 2015/0332213 | A1* | 11/2015 | Galluzzo | B25J 9/1692 |
| | | | | 700/216 |
| 2016/0101940 | A1* | 4/2016 | Grinnell | G05D 1/0297 |
| | | | | 700/216 |
| 2016/0247109 | A1* | 8/2016 | Scicluna | G06Q 10/06315 |
| 2017/0297820 | A1* | 10/2017 | Grinnell | B65G 1/1373 |
| 2018/0281657 | A1* | 10/2018 | Healey | G06Q 10/083 |
| 2018/0346246 | A1* | 12/2018 | Grinnell | G05D 1/0289 |
| 2019/0389659 | A1* | 12/2019 | Grinnell | B25J 9/1679 |

\* cited by examiner

FIG.3

VEHICLE INFORMATION MANAGEMENT TABLE

| VEHICLE ID | INITIAL EQUIPMENT | RETURN PLACE | CURRENT POSITION | TRANSPORTATION SERVICE |
|---|---|---|---|---|
| V001 | SET A | P1 | P1 | OPERATING |
| V002 | SET A | P2 | P2 | NOT OPERATING |
| V003 | SET B | P3 | P3 | NOT OPERATING |
| V004 | SET C | P4 | P4 | NOT OPERATING |
| V005 | SET C | P5 | P5 | NOT OPERATING |

FIG.4

USER ATTRIBUTE INFORMATION TABLE

| USER ID | SECTION ID | JOB TYPE |
|---------|------------|------------|
| U001 | SECTION A | SALES |
| U002 | SECTION B | MANAGEMENT |
| U003 | SECTION C | SALES |
| U004 | SECTION D | SALES |
| U005 | SECTION E | DESIGN |

FIG.5

ITEM MANAGEMENT INFORMATION TABLE

| ITEM ID | INDIVIDUAL ID | RETURN PLACE | ITEM-EQUIPPED VEHICLE ID |
|---|---|---|---|
| ITEM A | IT001 | BUILDING A | VEHICLE A |
| ITEM B | IT002 | BUILDING B | ... |
| ITEM C | IT101 | BUILDING C | ... |
| ITEM D | IT030 | BUILDING D | ... |
| ITEM E | IT049 | BUILDING E | ... |

FIG.6

EQUIPMENT SETTING TABLE

| SECTION ID | JOB TYPE | INITIAL EQUIPMENT | ADDITIONAL ITEM#1 | ADDITIONAL ITEM#2 | ADDITIONAL ITEM#3 |
|---|---|---|---|---|---|
| SECTION#A | SALES | SET A | ITEM A | ITEM D | ... |
| SECTION#B | MANAGEMENT | SET A | ITEM B | ... | ... |
| SECTION#C | SALES | SET B | ITEM A | ... | ... |
| SECTION#D | SALES | SET C | ITEM A | ... | ... |
| SECTION#E | DESIGN | SET C | ITEM C | ... | ... |

FIG.7

ITEM EQUIPMENT INFORMATION TABLE

| STOPOVER PLACE | ITEM ID | LOCATION | EQUIPMENT STATUS |
|---|---|---|---|
| 1 | ITEM A | ... | COMPLETE |
| 2 | ITEM B | ... | ... |
| 3 | ITEM C | ... | ... |
| 4 | ITEM D | ... | ... |
| 5 | ITEM E | ... | ... |

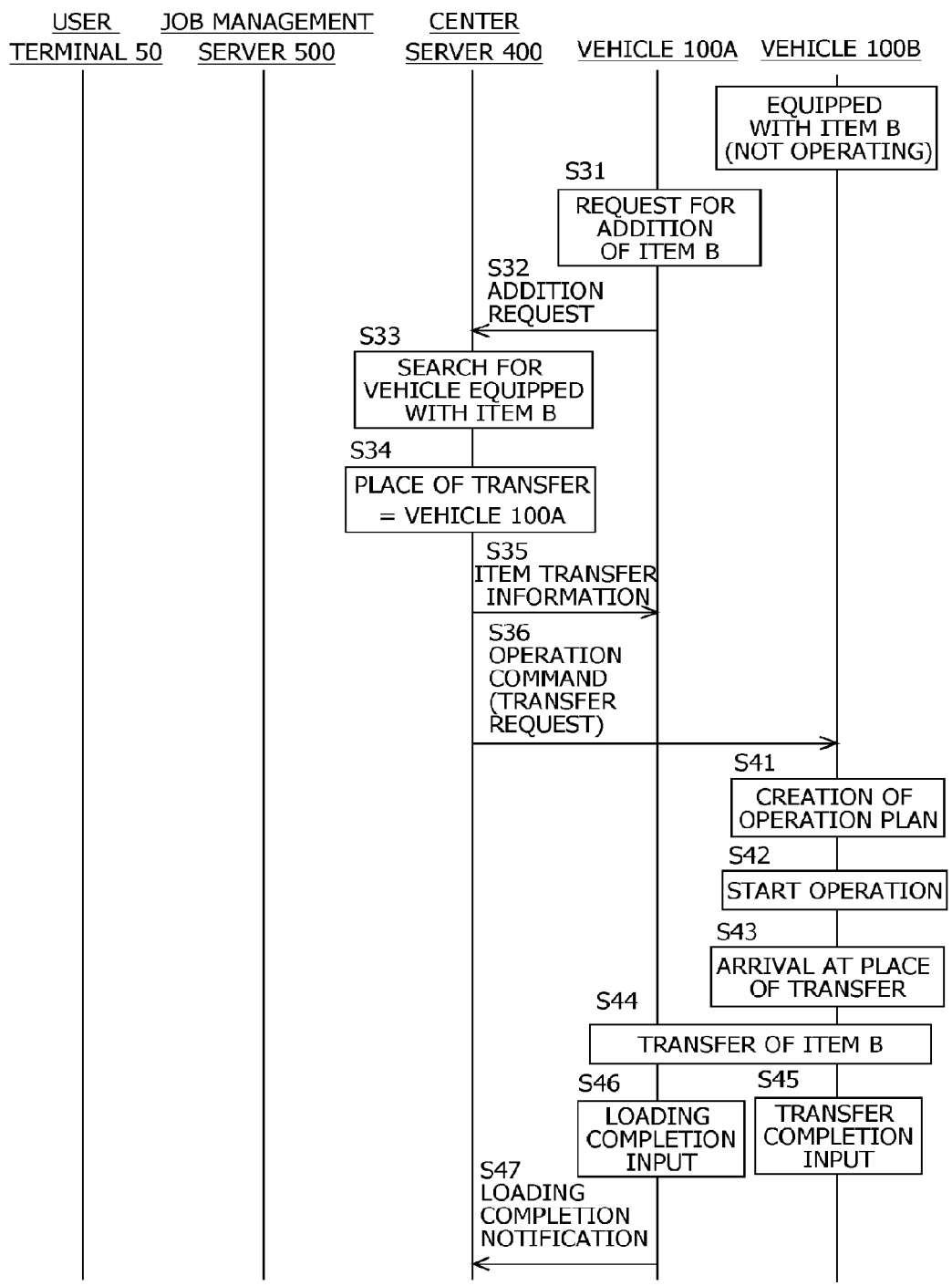

MOBILE OBJECT SYSTEM AND CONTROL METHOD FOR MOBILE OBJECT SYSTEM

CROSS REFERENCE TO RELATED APPLICATION

This application claims the benefit of Japanese Patent Application No. 2017-252156, filed on Dec. 27, 2017, which is hereby incorporated by reference herein in its entirety.

BACKGROUND

Technical Field

The present invention relates to a mobile object system that dispatches a vehicle capable of moving autonomously to a destination and a control method for a mobile object system.

Description of the Related Art

Vehicles are typically used for the purpose of transporting users or goods to desired destinations. Use of an interior space of a vehicle as a space for a certain work by a user has also been developed. For example, Patent Document 1 in the citation list below discloses a mobile office constructed by a plurality of vehicles attached together, in which office equipment is arranged in a usable manner. The plurality of vehicles is attached to a connector vehicle used to connect the vehicles to allow movement of persons between the vehicles through the connector vehicle. Thus, an office space having a desired size is provided. Moreover, the comfortableness of the office is enhanced by attaching a vehicle having at least one of a generator, air-conditioner, bathroom, lavatory, and kitchen equipment to the connector vehicle. The mobile office disclosed in Patent document 1 is constructed by gathering a plurality of vehicles and a connector vehicle at a certain place and attaching them together.

CITATION LIST

Patent Document

Patent document 1: Japanese Patent Laid-Open No. 1997-183334

SUMMARY

For example, when providing mobile object service that dispatches an autonomous vehicle having specific equipment, which is not limited to a mobile office, to a certain destination, it is desirable that the vehicle be provided with equipment customized to the user of the vehicle. However, it is difficult to prepare vehicles provided with equipment that meets demands of different users beforehand. Users may customize the equipment of a vehicle dispatched to them by setting desired equipment by themselves. However, this is troublesome to the users, possibly discouraging them from using the service.

The present disclosure has been made in view of the above various circumstances. An object of the present disclosure is to provide a technology that, in a system that dispatches an autonomous vehicle to a place where a user is located, the autonomous vehicle having customized equipment is enable to be dispatched.

To solve the above problem, there is provided a mobile object system that dispatches a vehicle capable of moving autonomously to a destination at which a user is located, comprising a controller comprising at least one processor configured to receive a request for use of the vehicle provided with first equipment, and send to the vehicle a first command to travel to a first destination, the first command designating a place where at least a part of the first equipment is present as a first stopover place, wherein the vehicle may travel, in accordance with the first command, from the first stopover place to the first destination after loading of the at least a part of the first equipment onto the vehicle at the first stopover place is completed to complete the first equipment.

The first equipment may be one integral equipment or include a plurality of pieces of equipment. The first stopover place may be one place or include a plurality of places depending on the places where the aforementioned at least a part of the first equipment is present. For example, in the case where the first equipment is one integral equipment, the aforementioned at least a part of the first equipment is the first equipment as integral equipment. Then, the number of the places where the aforementioned at least a part of the first equipment is present is one, and there is only one first stopover place. In the case where the first equipment includes a plurality of pieces of equipment and the aforementioned at least a part of the first equipment is one piece of equipment, the number of the places where the aforementioned at least a part of the first equipment is present is one, and there is only one stopover place. In the case where the first equipment includes a plurality of pieces of equipment and the aforementioned at least a part of the first equipment includes a plurality of pieces of equipment, there may be one or a plurality of places where the aforementioned at least a part of the first equipment is present. Therefore, in the case where the first equipment includes a plurality of pieces of equipment and the aforementioned at least a part of the first equipment includes a plurality of pieces of equipment, there may be either one or a plurality of stopover places.

In the above-described mobile object system, the at least one processor may send to a vehicle a first command to travel to a first destination designating the place where at least a part of the first equipment is present as the first stopover place, and the vehicle may move, in accordance with the first command, from the first stopover place to the first destination after loading of at least a part of the first equipment onto the vehicle at the first stopover place is completed to complete the first equipment. In consequence, at the time when the vehicle arrives at the first destination, the equipment of the vehicle has already been customized with the provision of at least a part of the first equipment. Thus, the mobile object system can dispatch a vehicle provided with equipment that is customized according to needs or attributes of the user. Consequently, the user can conduct a desired work immediately after getting on the vehicle. This increases the user convenience of the mobile object system.

The above-described mobile object system may include a plurality of vehicles capable of moving autonomously that are provided with certain equipment, the at least one processor may be configured to select a vehicle provided with a part of the first equipment as a vehicle to be dispatched to the first destination from among the plurality of vehicles and send the first command to travel to the first destination via the first stopover place to the selected vehicle so that the remaining part of the first equipment other than the aforementioned part is loaded onto the selected vehicle at the first stopover place. The remaining part of the first equipment other than the aforementioned part corresponds to the aforementioned at least part of the first equipment mentioned in the above description of the mobile object system. A plurality of vehicles provided with different sets of equipment may be prepared in advance. This can eliminate the effort and time of customizing the equipment of a vehicle, leading to a reduction in the time taken to deliver the vehicle to a destination.

In the above-described mobile object system, the at least one processor may be configured to search for a second vehicle capable of moving autonomously that is provided with second equipment that is to be loaded onto a first vehicle capable of moving autonomously, determine a place of transfer of the second equipment in a certain area including at least a current position of the first vehicle and a current position of the second vehicle, and send a command to travel to the place of transfer of the second equipment to both or either one of the first and second vehicles. In the case where the first vehicle corresponds to the vehicle mentioned in the above-described mobile object system, the second equipment to be loaded onto the first vehicle may be equipment corresponding to the aforementioned at least a part of the first equipment. In that case, for example, the place of transfer of the second equipment corresponds to the place where at least a part of the first equipment is present and the first stopover place in the aforementioned mobile object system, and the command to travel to the place of transfer is included in the first command in the aforementioned mobile object system. The first vehicle may correspond to the vehicle in the aforementioned mobile object system, and the second equipment to be loaded onto the first vehicle may be equipment other than the aforementioned at least a part of the first equipment in the aforementioned mobile object system. In that case, for example, the place of transfer of the second equipment is different from the place where at least a part of the first equipment is present or the first stopover place in the aforementioned mobile object system, and the command to travel to the place of transfer is a command that is different from the first command in the aforementioned mobile object system.

In cases where the second equipment to be loaded onto the first vehicle is present in the second vehicle, a place of transfer is determined and a command to travel to that place of transfer is sent to both or either one of the first and second vehicles to enable transfer of an item between the vehicles.

In the above-described mobile object system, after the end of use of the vehicle provided with the first equipment by the user, the processor may send a second command designating a place of return of the at least a part of the first equipment as a second stopover place and a designation of a place of return of the vehicle as a second destination, and the vehicle may travel, in accordance with the second command, from the second stopover place to the second destination after returning of the at least a part of the first equipment at the second stopover place is completed. The second stopover place may be either the place same as or a place different from the first stopover place in the above-described mobile object system. The second destination may be either the place same as or a place different from the first destination in the above-described mobile object system. In any case, the second command is a command that is sent at a time different from the time at which the first command is sent in the above-described mobile object system.

In the above described case, after the end of use of the vehicle by the user, the vehicle returns to its return place, and on the way to its return place, the aforementioned at least a part of the first equipment that was loaded onto the vehicle at the stopover place on the way to the destination at which the user was present is returned. In consequence, the vehicle is returned to its return place in the initial state. When the vehicle receives a new command to travel to another destination later, other different equipment may be loaded onto the vehicle. This increases the versatility of the vehicle.

The mobile object system according to the present disclosure may include one or a plurality of processing devices, such as computers. In the case where the mobile object system includes a plurality of processing devices, the components of the mobile object system are distributed to the plurality of processing devices, and the processing devices cooperate to implement the processing of the mobile object system. The mobile object system according to the present disclosure may be constructed either in or outside the aforementioned vehicle.

According to another aspect of the present disclosure, there is provided a control method for a mobile object system that dispatches a vehicle capable of moving autonomously to a destination. The method of controlling a mobile object system that dispatches a vehicle capable of moving autonomously to a destination at which a user is located comprises: receiving a request for use of the vehicle provided with first equipment; sending to the vehicle a command to travel to the destination, the command designating a place where at least a part of the first equipment is present as a stopover place; and causing the vehicle to travel, in accordance with the command, from the stopover place to the destination when loading of the at least a part of the first equipment onto the vehicle at the stopover place is completed to complete the first equipment. The technical features that have been described above in connection with the above-described mobile object system can also be applied to the control method for the mobile object system if technically feasible.

The above-described mobile object system may include a plurality of vehicles provided with certain equipment, and the above-described control method for the mobile object system may select a vehicle provided with equipment adapted to attributes of a user as a vehicle to be dispatched to the destination from among the plurality of vehicles.

The present disclosure enables a vehicle having customized equipment to be dispatched in a system that dispatches a vehicle capable of moving autonomously to a place where a user is present.

BRIEF DESCRIPTION OF THE DRAWINGS

FIG. 3 is an example of a vehicle management information table;

FIG. 4 is an example of a user attribute information table;

FIG. 5 is an example of an item management information table;

FIG. 6 is an example of an equipment setting table;

FIG. 7 is an example of an item equipment information table;

FIG. 16 is a diagram illustrating an exemplary sequential process in a case where a request for addition of an item is made in the vehicle.

DESCRIPTION OF THE EMBODIMENT

In the following, specific embodiment of the present invention will be described with reference to the drawings. It should be understood that the features of the embodiments described are not intended to limit the technical scope of the present invention only to them, unless stated otherwise.

First Embodiment

<Outline of the System>

Figure 1:
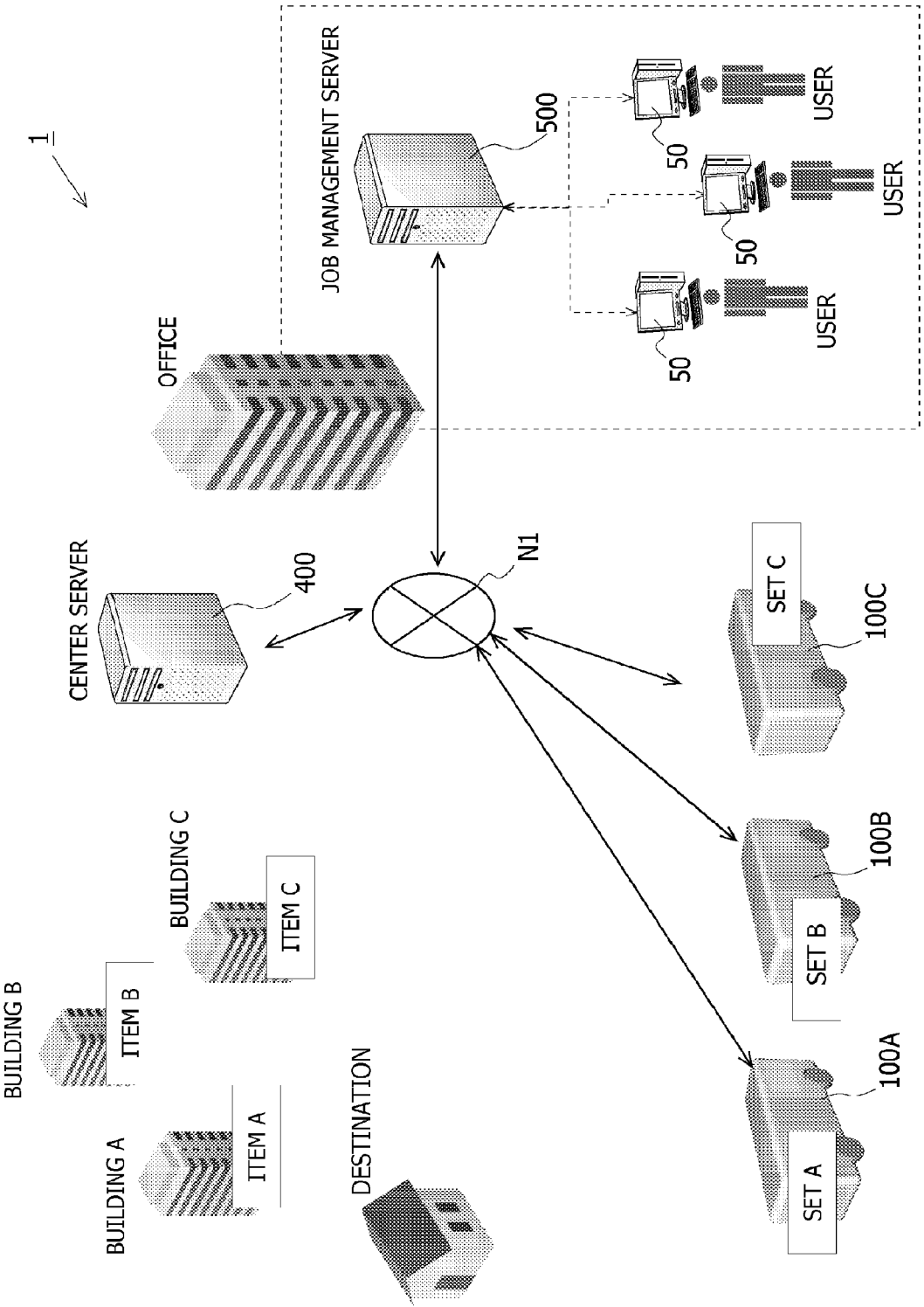
FIG. 1 is a diagram illustrating an example of a configuration of a mobile object system according to a first embodiment.

FIG. 1 is a diagram illustrating an exemplary configuration of a mobile object system 1 according to a first embodiment. The mobile object system 1 includes a plurality of autonomous vehicles 100 that run autonomously in accordance with given commands, a center server 400 that issues the commands, a job management server 500, and user terminals 50 of respective users that are connected to the job management server 500 in an office. The autonomous vehicles 100 will be simply referred to as "vehicles" hereinafter. The vehicles 100 are autonomous driving vehicles that provide certain services. The center server 400 is an apparatus that manages the plurality of vehicles 100. The autonomous vehicle or autonomous driving vehicle is a vehicle that can run without operations by a human driver. One of the services provided by the vehicles 100 is transporting a user to a destination. This service will be hereinafter referred to as transportation service. The mobile object system includes a plurality of vehicles 100. The mobile object system 1 is an example of the "mobile object system.", and the vehicle 100 is an example of the "vehicle capable of moving autonomously.".

The job management server 500 is an apparatus that manages jobs of the staffs (users) belonging to a business entity. When a user belonging to that business entity wants to use a vehicle 100 for business, he or she accesses the center server 400 from his/her own user terminal 50 through the job management server 500.

The vehicles 100 are multipurpose mobile objects that can change their individual functions. The vehicles 100 can run autonomously on the road. The vehicle 100 used in the mobile object system 1 moves to a designated destination. The destination of the vehicle 100 is designated by, for example, the center server 400 or a user who gets on the vehicle 100. The route to the destination may be either designated by the center server 400 or the user or determined autonomously by the vehicle 100. In the following description of the first embodiment, let us assume that the route to the destination is determined by the vehicle 100.

The function of the vehicle 100 can be changed by adding, removing, or changing an item(s) to the equipment that the vehicle 100 is provided. In the first embodiment, an item is one of the components of the equipment of the vehicle 100. An item added to the vehicle 100 is an exemplary additional equipment added to the vehicle 100. Examples of the item include, a PC, a projector, a printer, and a paper book that are used in business. The items are not limited to those used in business. The additional equipment and the item are examples of "at least a part of the first equipment."

In the system according to the first embodiment, multiple types of vehicles 100 that have different initial equipment are prepared. In the illustrative case illustrated in FIG. 1, the vehicle 100A is provided with a set A, the vehicle 100B is provided with a set B, and the vehicle 100C is provided with a set C, as respective initial equipment. In cases where it is not necessary to distinguish individual vehicles, the vehicles will be referred to as vehicles 100.

In the illustrative case illustrated in FIG. 1, the center server 400, the vehicles 100, the job management server 500 in the mobile object system 1 are interconnected by a network N1. The network N1 is a worldwide public communication network, such as the Internet. A wide area network (WAN) or other communication network may be employed as the network N1. The network N1 may include a telephone network such as a cellular telephone network and/or a wireless communication network such as a WiFi network. The user terminal 50 of each user is connected to the job management server 500 by an intranet arranged in the office. The intranet may also include a telephone network such as a cellular telephone network and/or a wireless communication network such as a WiFi network.

The center server 400 is an apparatus in the mobile object system 1 that commands a vehicle 100 to perform an operation when a request for use of a vehicle 100 is made by a user. When receiving a request for use by a user, the center server 400 selects a vehicle 100 having appropriate initial equipment for attribute information of the user as a vehicle to be dispatched to the requesting user. In cases where, in addition to the initial equipment, an additional item(s) is needed depending on the attribute information of the user, the center server 400 determines a place(s) where the additional item(s) is (are) present. The center server 400 sets the pickup place designated by the user as the destination and the place(s) where the additional item(s) is (are) present as a stopover place(s) and sends an operation command to the selected vehicle 100. The operation command includes, for example, identification information of the item to be loaded onto the vehicle as well as information specifying the destination and the stopover place(s). The request for use of a vehicle 100 is an example of "request for use of vehicle." The operation command is an example of "command."

In the system according to the first embodiment, when receiving the operation command from the center server 400, the vehicle 100 determines a route to the destination via the stopover place(s) and starts to travel. The vehicle 100 is load with the designated additional item(s) at the stopover place(s). After loaded with all the designated additional items, the vehicle 100 starts to travel for the pickup place set as the destination. Thus, the equipment of the vehicle 100 is customized to be appropriate for the attribute of the user on arriving at the pickup place. In other words, the system can dispatch a vehicle 100 provided with customized equipment.

In the system according to the first embodiment, if a request for addition of an item is made by the user after the user gets on the vehicle 100, the center server 400 determines the location of the additional item. In cases where the location of the additional item is a certain building, the center server 400 sends, to the vehicle 100 which is requesting for addition of an item, an operation command that causes the vehicle 100 to travel to that building. If the location of the additional item is another vehicle 100, the center server 400 determines a place of transfer of the additional item and sends an operation command that determines the place of transfer of the item to either one or both of the vehicle 100 and the another vehicle 100 to cause either one or both of the vehicle 100 and the another vehicle 100 to move to the place of transfer.

Note the each of the vehicles 100 sends information about the route to the destination it has determined, the state of equipment of items, and its own position information to the center server 400 as necessary. Thus, the center server 400 has such information.

<System Configuration>

Figure 2:
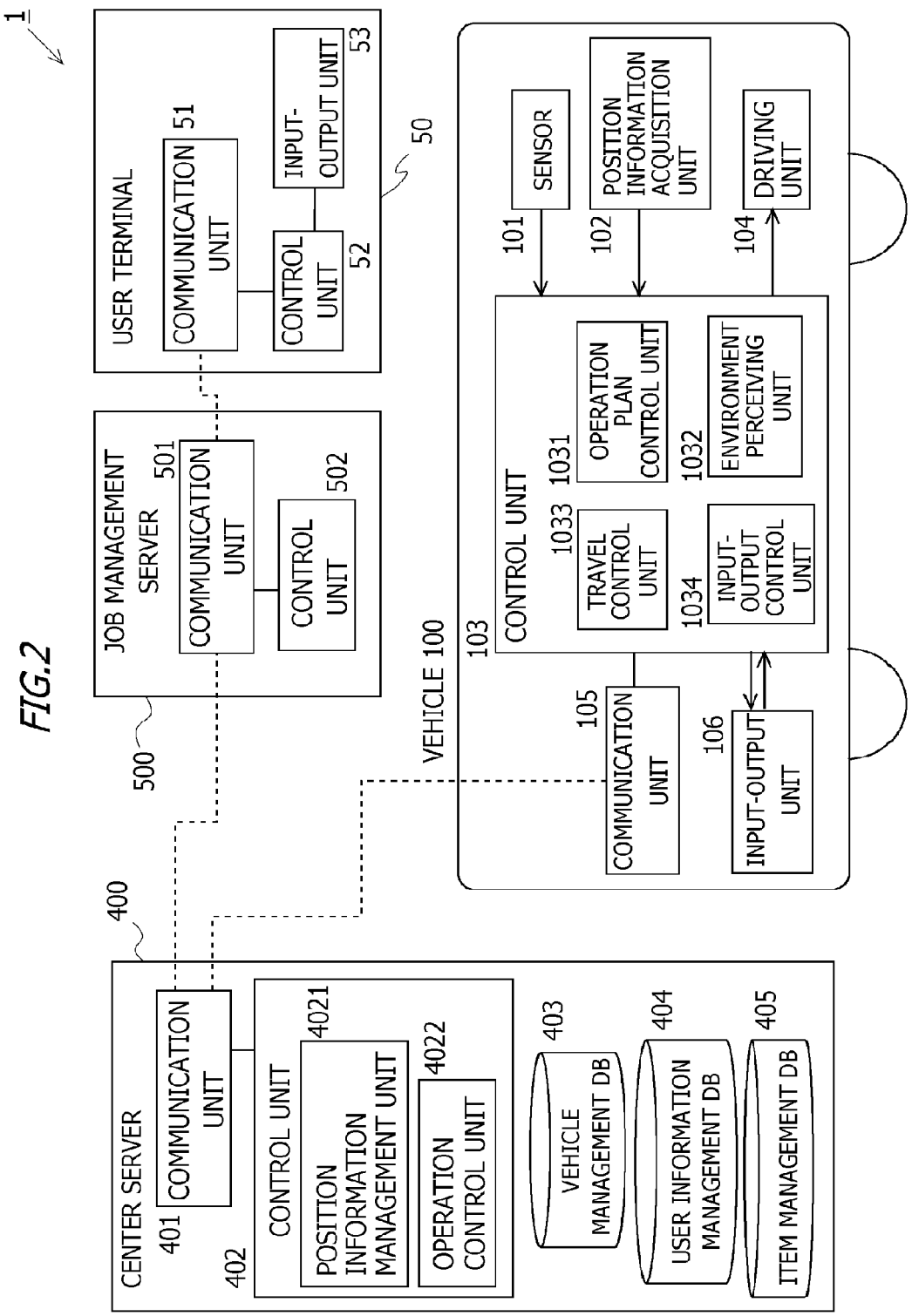
FIG. 2 is a block diagram illustrating the respective configurations of a center server, a vehicle, a job management server, and a user terminal.

FIG. 2 is a block diagram schematically illustrating the configuration of the center server 400, the vehicle 100, the job management server 500, and the user terminal 50. The hardware configuration and the functional configuration of the center server 400, the vehicle 100, the job management server 500, and the user terminal 50 will be described in the following with reference to FIG. 2.

The vehicle 100 travels in accordance with an operation command received from the center server 400. Specifically, the vehicle 100 creates a travel route in accordance with an operation command received through wireless communication and travels on the road by autonomous driving in an appropriate manner while sensing its environment. The vehicle 100 includes a sensor 101, a position information acquisition unit 102, a control unit 103, a driving unit 104, a communication unit 105, and an input-output unit 106. The vehicle 100 operates by electrical power supplied by a battery, which is not illustrated in the drawings.

The sensor 101 senses the environment of the vehicle 100 to acquire information used for autonomous driving of the vehicle 100. The sensor 101 includes, for example, a stereo camera, a laser scanner, a LIDAR (Light Detection and Ranging), a radar, or the like. Data acquired by the sensor 101 is sent to the control unit 103, and used by the control unit 103 to perceive objects such as obstacles present around the vehicle 100 and the driving lane. The sensor 101 according to the first embodiment includes a visible light camera for surveillance.

The position information acquisition unit 102 is means for acquiring the current position of the vehicle 100. The position information acquisition unit 102 includes a GPS (Global Positioning System) receiver, or the like. Information acquired by the position information acquisition unit 102 is sent to the control unit 103, and used, for example, in processing such as calculation of a route of travel of the vehicle 100 to a destination by using the information about the current position of the vehicle 100.

The control unit 103 is a computer that controls the vehicle 100 on the basis of the information acquired through the sensor 101 and the position information acquisition unit 102. The control unit 103 includes, for example, a microcomputer. The functions of performing the above-described various processing are implemented by executing programs stored in storage, such as a read only memory (ROM) (not illustrated), in the microcomputer by a central processing unit (CPU) (not illustrated) of the microcomputer. Specifically, the control unit 103 includes as functional modules an operation plan control unit 1031, an environment perceiving unit 1032, a travel control unit 1033, and an input-output control unit 1034.

The operation plan control unit 1031 receives an operation command from the center server 400 and creates an operation plan of the vehicle. The operation command includes, for example, information about a destination given to the vehicle 100, a stopover place(s) and an item(s) with which the vehicle is to be equipped. Consequently, the operation plan control unit 1031 calculates a route along which the vehicle 100 is to travel on the basis of the destination and the stopover place(s) given by the center server 400 and the position of the vehicle acquired by the position information acquisition unit 102 and creates an operation plan. The operation plan includes data about the route along which the vehicle 100 is to travel calculated as above and data specifying a task(s) to be done by the vehicle 100 in a part or the entirety of the route. Examples of data included in the operation plan are as follows.

(1) Data that Specifies a Route Along which the Vehicle is to Travel by a Set of Road Links The route along which the vehicle is to travel may be created automatically in accordance with a given place of departure, stopover place(s), and destination with reference to map data stored in storage. The calculation of the route along which the vehicle is to travel may be performed by processing in an external device (e.g. the center server 400) instead of the vehicle 100. In that case, the center server 400 is informed by the vehicle 100 of its position, calculates a route along which the vehicle 100 is to travel, and includes data of the calculated route in the aforementioned operation command.

(2) Data that Specifies a Task(s) to be Done by the Vehicle at a Certain Location(s) in the Route Examples of the tasks to be done by the vehicle include, but are not limited to, picking up and dropping off a user and loading an item. The operation plan created by the operation plan control unit 1031 is sent to the travel control unit 1033, which will be described later.

In cases where the operation command received from the center server 400 includes information about an additional item(s), the operation plan control unit 1031 manages the state of equipment of the item(s). The operation plan control unit 1031 controls the vehicle 100 in such a way as to let the vehicle 100 travel to the pickup place (i.e. the destination) after verifying the equipment of all the additional items.

The environment perceiving unit 1032 acquires information about the environment around the vehicle 100 to be used for the purpose of autonomous driving, using the data acquired by the sensor 101. What is perceived (or information acquired) by the environment perceiving unit 1032 includes, but is not limited to, the number and the position of lanes, the number and the position of other vehicles present around the vehicle, the number and the position of obstacles (e.g. pedestrians, bicycles, structures, and buildings) present around the vehicle, the structure of the road, and road signs. What is perceived may include anything that is useful for autonomous traveling. For example, in the case where the sensor 101 includes a stereo camera, objects present around the vehicle 100 are perceived by image processing using image data acquired by the stereo camera. The environment perceiving unit 1032 may not only perceiving objects present around the vehicle 100 but also track a perceived object(s). Tracking is, for example, continuous perception of a perceived object. Thus, it is possible to calculate the relative speed of an object from the difference between the coordinates of that object determined in a previous step and the current coordinates of that object. The data relating to the environment of the vehicle 100 acquired by the environment perceiving unit 1032 is sent to the travel control unit 1033, which will be described below. The data relating to the environment around the vehicle 100 will be hereinafter referred to as "environment data".

The travel control unit 1033 creates a control command for controlling autonomous travelling of the vehicle on the basis of the operation plan created by the operation plan control unit 1031, the environment data acquired by the environment perceiving unit 1032, and the position information of the vehicle acquired by the position information acquisition unit 102. For example, when receiving a travel start command through the input-output control unit 1034, the travel control unit 1033 creates a control command so as to cause the vehicle to travel along a specific route in such a way that obstacles will not enter a certain safety zone around the vehicle. The control command thus created is sent to the driving unit 104, which will be described later. The control command for autonomously driving the vehicle may be created by a known method.

The input-output control unit 1034 displays an operation screen on the input-output unit 106 and creates a request in response to an operation performed by the user aboard the vehicle 100. For example, the input-output control unit 1034 displays on a touch panel display an entry field into which a destination is to be entered, an icon for starting the travel of the vehicle, an icon for entering a notice of completion of loading of the items, and an icon for making a request for addition of an item etc. Then, for example, the input-output control unit 1034 creates a travel start command and a request for addition of an item according to operations performed by the user. For example, the travel start command is output to the travel control unit 1033. For example, the request for addition of an item is sent to the center server 400 through the communication unit 105. The operations performed by the user aboard the vehicle 100 are not limited to operations performed through a touch panel display. Operations may also be performed by, for example, a hardware switch or the like or voice. The user who is aboard the vehicle 100 or gets on the vehicle 100 will be hereinafter referred to as the usage user.

The driving unit 104 is means for driving the autonomous vehicle 100 in accordance with a control command created by the travel control unit 1033. The driving unit 104 includes, for example, a motor and inverter for driving wheels, a brake, and a steering system. The motor, the brake and other components are driven in accordance with the control command to achieve autonomous driving.

The communication unit 105 serves as communication means for connecting the vehicle 100 to the network N1. In the first embodiment, the communication unit 105 can communicate with other devices (e.g. the center server 400) via the network N1 using a mobile communication service based on e.g. 3G (3rd Generation) or LTE (Long Term Evolution).

The input-output unit 106 is a user interface serving as means for receiving operation entries by the usage user and presenting information to the usage user. The input-output unit 106 includes, for example, a touch panel, control means for the touch panel, a liquid crystal display, and control means for the liquid crystal display. In the first embodiment, a single touch panel display is used, which serves as both the touch panel and the liquid crystal display. The input-output unit 106 is not limited to the touch panel display. It may include a hardware switch or the like. The input-output unit 106 may include a voice input device and a voice output device, such as a microphone and a speaker, to allow operations by voice.

The center server 400 is configured as an ordinary computer. Specifically, the center server 400 is a computer having a processor (not illustrated), such as a CPU (Central Processing Unit) or a DSP (Digital Signal Processor), a main memory (not illustrated), such as a RAM (Random Access Memory) or a ROM (Read Only Memory), and an auxiliary storage (not illustrated), such as an EPROM (Erasable Programmable ROM), an HDD (hard disk drive), or a removable medium. Examples of the removable medium include a USB (Universal Serial Bus) memory or a disk recording medium, such as a CD (Compact Disc) or a DVD (Digital Versatile Disc). What is stored in the auxiliary storage includes an operating system (OS), various programs, and various tables. Programs stored in the auxiliary storage are loaded to a workspace of the main memory and executed. Various components are controlled by executing the programs, whereby appropriate functions for achieving desired purposes are provided.

The center server 400 has a communication unit 401. The communication unit 401 connects with other devices via the network N1 to communicate with the vehicles 100 and the job management server 500. The communication unit 401 includes, for example, a LAN (Local Area Network) interface board or a wireless communication circuit for wireless communication. The LAN interface board or the wireless communication circuit connects with an access network such as a LAN or a wireless LAN and further with the network N1, which is a public network such as the Internet, through the access network.

The center server 400 has a vehicle management database 403, a user information management database 404, and an item management database 405 in its auxiliary storage. These databases (DB) are constructed by management of data stored in the auxiliary storage by database management system (DBMS) programs executed by the processor. The vehicle management database 403, the user information management database 404, and the item management database 405 are, for example, relational databases.

The vehicle management database 403 holds various information about a plurality of vehicles 100 capable of moving autonomously. The user information management database 404 holds various information about users. The item management database 405 holds various information about items. Details of the information stored in the vehicle management database 403, the user information management database 404, and the item management database 405 will be described later.

The center server 400 has a control unit 402, which is implemented as a functional block by executing a program by the aforementioned processor. The control unit 402 includes as functional blocks a position information management unit 4021 and an operation control unit 4022.

The position information management unit 4021 collects position information from a plurality of vehicles 100 that are under the management of the center server 400. Specifically, the position information management unit 4021 receives current position information from the plurality of vehicles 100 at predetermined intervals and stores the current position information in the vehicle management database 403.

When a request for use of a vehicle 100 is received from a user, the operation control unit 4022 determines the vehicle 100 to be dispatched and creates an operation command according to the request for use. The request for use contains, for example, identification information of the usage user and information about the pickup place. The information about the pickup place is, for example, the address of the pickup place, the name of a building, or the longitude and latitude. In the following description, information about a destination, a stopover place, or other places is assumed to be the address of the place in question, the name of a building, or the longitude and latitude.

The request for use may further contain information about the equipment of a vehicle 100 that the usage user wants. The information about the equipment of a vehicle 100 the user wants includes, for example, information designating initial equipment of a vehicle 100 and information designating an item(s) to be added to the vehicle 100. When receiving such a request for use, the operation control unit 4022 selects a vehicle 100 having the designated equipment and creates an operation command on the assumption that the vehicle 100 is to move to the pickup place as the destination after stopping over at the location of the additional item to load that additional item.

When receiving a request for addition of an item from a vehicle 100, the operation control unit 4022 determines the location of the additional item. In the case where the location of the additional item is a building, the operation control unit 4022 sends to the vehicle 100 an operation command designating the location of the additional item as the destination. In the case where the location of the additional item is another vehicle 100 and the additional item is not being used in the another vehicle 100, the operation control unit 4022 determines a place of transfer of that item. The place of transfer of the item is determined, for example, on the basis of the position information of the vehicle 100 and the another vehicle 100 in which the additional item is present, the status of their transportation service and/or other factors. The place of transfer of the item may be the current position of the vehicle 100, the current position of the another vehicle 100 in which the additional item is present, the midpoint between the vehicles 100, or a certain place on the operation route of one of the vehicles 100.

The operation control unit 4022 sends an operation command designating the place of transfer as the destination to one or both of the vehicle 100 and the another vehicle 100 in which the additional item is present according to the place of transfer of the additional item. The operation control unit 4022 also sends item transfer information relating to the additional item to the vehicle 100 requesting for addition of the item. The item transfer information includes, for example, identification information of the item, information about the location of the item (which may be, in the case where the item is present in a vehicle 100, identification information of that vehicle 100), and information about details of setting.

When receiving a notice of completion of transportation service input by the usage user from a vehicle 100, the operation control unit 4022 sends an operation command designating a place of return as the destination to that vehicle 100. In consequence, the vehicle 100 that has completed its transportation service returns to the designated place of return.

The operation control unit 4022 also receives from each vehicle 100 the route to the destination, the state of equipment of items, position information of the vehicle 100, and the status of transportation service and stores them in the respective databases. Details of the process performed by the operation control unit 4022 will be described later with reference to a flow chart.

One or some of the functional units of the center server 400 or some processing executed by them may be provided or executed by another computer connected to the network N1. A series of processing executed in the center server 400 may be executed by either hardware or software.

The job management server 500 is configured as an ordinary computer. The job management server 500 manages the progress of respective jobs of a plurality of users in the office. To enable this, the user terminal 50 of each of the users is configured to be capable of accessing the job management server 500 through the intranet in the office. Moreover, the user can access the center server 400 by the user terminal 50 to make a request for use of a vehicle 100. In this process, the job management server 500 relays the communication between the user terminal 50 and the center server 400.

Specifically, the job management server 500 is a computer similar to the center server 400 having a processor (not illustrated), such as a CPU or a DSP, a main memory (not illustrated), such as a RAM or a ROM, and an auxiliary storage (not illustrated), such as an EPROM, an hard disk drive, or a removable medium. In the auxiliary storage, an operating system, various programs, and various tables are held. Programs stored in the auxiliary storage are loaded to a workspace of the main memory and executed. Various components are controlled by executing the programs, whereby appropriate functions for achieving desired purposes are provided.

The job management server 500 further includes a communication unit 501. As with the communication unit 401 of the center server 400, the communication unit 501 connects with other devices to provide communication between the job management server 500 and other devices (e.g. the center server 400). The communication unit 501 includes, for example, a LAN interface board or a wireless communication circuit for wireless communication. The LAN interface board or the wireless communication circuit connects with an access network such as a LAN or a wireless LAN and further with the network N1, which is a public network such as the Internet, through the access network.

The job management server 500 has a control unit 502, which is implemented as a functional unit by executing a program by the aforementioned processor. The control unit 502 relays the communication between a user terminal 50 and the center server 400 through the communication unit 501 when, for example, a user makes a request for use of a vehicle 100.

One or some of the functional units of the job management server 500 or some processing executed by them may be provided or executed by another computer connected to the network N1. A series of processing executed in the job management server 500 may be executed by either hardware or software.

Next, the user terminal 50 used by a user will be described. In the system according to the first embodiment, the user terminal 50 is a device used by a user to carry out his/her own job in the office. However, the user terminal 50 may be used for other purposes. The user terminal 50 is a personal computer connected to the job management server 500 through the intranet in the office. Alternatively, the user terminal 50 may be a small computer used for user's job, such as a smartphone, a cellular phone, a tablet terminal, a personal information terminal, or a wearable computer (e.g. a smart watch). The user can connect the user terminal 50 to the network N1 through the job management server 500. The user terminal 50 used by a user has a communication unit 51, a control unit 52, and an input-output unit 53.

The communication unit 51 is communication means for connection with the job management server 500 through the intranet. The control unit 52 is a computer that controls the user terminal 50. The control unit 52 is, for example, a microcomputer and provides functions for performing various processing by executing programs stored in storage means (e.g. ROM) by a CPU, neither of which is illustrated in the drawings. The control unit 52 interacts with the user through the input-output unit 53. The input-output unit 53 is means for receiving operation entries by the user and presenting information to the user. Specifically, the input-output unit 53 includes, for example, a touch panel, control means for the touch panel, a liquid crystal display, and control means for the liquid crystal display. In the first embodiment, a single touch panel display is used, which serves as both the touch panel and the liquid crystal display. Note that input operations performed by the user are not limited to operations performed on the touch panel display. For example, input operations may be performed through a hardware switch or the like.

The control unit 52 sends, for example, a request for use of a vehicle 100 input through the input-output unit 53 to the center server 400. In that case, information about the identification of the usage user, the pickup place, the pickup date and time, and equipment that the usage user wants is also sent with the request for use.

FIG. 3 illustrates an example of a vehicle management information table. The vehicle management information table is a table that holds vehicle management information relating to the vehicles 100. This table is stored in the vehicle management database 403 in the center server 400. The vehicle management information table includes fields of, for example, vehicle ID, initial equipment, return place, current position, and transportation service.

What is stored in the vehicle ID field is identification information for identifying all the vehicles 100 managed by the center server 400 in the mobile object system 1. What is stored in the initial equipment field is identification information of the kind of the initial equipment with which each vehicle 100 is provided. In the first embodiment, it is assumed that each vehicle is provided with a plurality of items as the initial equipment. In the illustrative case illustrated in FIG. 3, the identification information of the kind of the initial equipment stored in that field is identification information of a set of items with which each vehicle 100 is provided as the initial equipment.

What is stored in the return place field is information specifying the place that serves as the initial value of the location of each vehicle 100. Each vehicle 100 is returned to the place of the initial value of its location after completing its transportation service, and the place of the initial value of the location of the vehicle 100 is the return place of the vehicle 100. In the following, the place of the initial value of the location of the vehicle 100 will be referred to as the return place. What is stored in the return place field may be an address, longitude and latitude, or identification information of a building (e.g. identification information of a branch office, garage, or warehouse), which serves as information specifying the return place of a vehicle 100.

What is stored in the present position field is position information representing the current position of each vehicle 100. The position information representing the current position of a vehicle 100 is the latitude and longitude or the address of the current position of that vehicle 100. The position information of the vehicle 100 is acquired by, for example, the position information acquisition unit 102 of the vehicle 100 and sent to the center server 400 at predetermined intervals by the vehicle 100. The current position field corresponding to that vehicle 100 in the vehicle management database 403 in the center server 400 is updated by the position information management unit 4021 every time position information is received from the vehicle 100.

What is stored in the transportation service field is information indicating whether or not each vehicle 100 is operating in user transportation service by autonomous travelling. For example, when a vehicle 100 is operating in transportation service, "operating" is input to the transportation service field, and when a vehicle 100 is not operating in transportation service, "not operating" is input to that field. The initial value of the transportation service field is "not operating". When the status of the transportation service field is "not operating", no usage user is on board the vehicle 100. However, even when the status of the transportation service field is "not operating", it does not necessarily mean that no humans are on board the vehicle 100. For example, there may be cases where a staff of the service provider, such as a service person, may be on board.

For example, when the operation control unit 4022 of the center server 400 receives a request for use from a user, selects the vehicle 100 to be dispatched, and sends an operation command to that vehicle 100, it inputs "operating service" in the transportation service field corresponding to that vehicle 100. Moreover, when the operation control unit 4022 of the center server 400 receives a notice of the complete of transportation service input by a usage user from a vehicle 100, it sends an operation command designating the return place as the destination to that vehicle 100 and inputs "not operating" in the transportation service field corresponding to that vehicle 100.

Note that the fields in the vehicle management information table in FIG. 3 are given as illustrative examples. The fields in the vehicle management information table are not limited to those in FIG. 3.

FIG. 4 illustrates an example of a user attribute information table. The user attribute information table is a table that holds attribute information of users. The user attribute information table is stored in the user information management database 404 in the center server 400. The user attribute information table includes the fields of, for example, user ID, section ID, and job type.

What is stored in the user ID field is identification information of each user. The identification information of the user is given to each user by, for example, the job management server 500. What is stored in the section ID field is identification information of the section to which each user belongs. What is stored in the job type field is information indicating the type of job of each user. In the illustrative case illustrated in FIG. 4, the job types stored in the job type field include sales, management, and design.

Note that the fields in the user attribute information table in FIG. 4 are given as illustrative examples. The fields in the user attribute information table are not limited to those in FIG. 4. For example, the user attribute information table may hold information about the title of each user and items supplied by the company (e.g. smartphone, cellular phone, PC, etc.)

FIG. 5 illustrates an example of an item management information table. The item management information table is a table that holds information about the places where items as components of additional equipment are present. The item management information table is stored in the item management database 405 in the center server 400. The item management information table includes the fields of, for example, item ID, individual ID, return place, and item-equipped vehicle ID.

What is stored in the item ID field is identification information indicating the kind of each item. The identification information of the kind of an item is, for example, the name or the product number of that item. What is stored in the individual ID field is identification information that is uniquely allotted to an individual item. In this specification, the term "item" without a modifier is used to refer to a type of item without distinguishing individual items. Furthermore, in this specification, the term "identification information of an item" is used to refer not to identification information of an individual item (i.e. individual ID) but to identification information of the kind of an item.

What is stored in the return place field is information specifying a place as the initial value of the location of each item. Each item is returned to the place of the initial value of the location of the item after the completion of transportation service by the vehicle 100 equipped with the item. Therefore, the place of the initial value of the location of an item is the return place of that item. In the following, the place of the initial value of the location of an item will be referred to as the return place of that item. What is stored in the return place field may be, for example, an address, longitude and latitude, or identification information of a building (e.g. identification information of a branch office, garage, or warehouse), which serves as information specifying the return place of an item.

What is stored in the item-equipped vehicle ID field is identification information of a vehicle 100 that is equipped or planned to be equipped with a corresponding item, if there is such a vehicle 100. The initial value of the item-equipped vehicle ID is, for example, blank.

For example, when receiving a request for use by a user, the operation control unit 4022 of the center server 400 selects the vehicle 100 to be dispatched and sends an operation command to that vehicle 100. If the operation command includes information about an additional item, the operation control unit 4022 inputs the identification information of the vehicle to be equipped with that item in the item-equipped vehicle ID field corresponding to that item. Moreover, when receiving a notice of completion of return of that item from the vehicle 100, the operation control unit 4022 of the center server 400 deletes the identification information of that vehicle 100 from the item-equipped vehicle ID field in which the identification information of that vehicle 100 is stored.

Note that the fields in the item management information table in FIG. 5 are given as illustrative examples. The fields in the item management information table are not limited to those in FIG. 5.

FIG. 6 illustrates an example of an equipment setting information table. The equipment setting table is a table that sets association between the user attribute information, the initial equipment of vehicles 100, and additional items. The equipment setting table is stored, for example, in the item management database 405 in the center server 400. The equipment setting table includes the fields of section ID, job type, initial equipment, and additional item.

The section ID field and the job type field are fields in which user attribute information is stored. What is stored in the section ID field is identification information of each section. What is stored in the job type field is information indicating the type of job. The identification information of the section and the identification information of the type of job are the same as those used in the user attribute information table.

What is stored in the initial equipment field is identification information of the kind of the initial equipment of vehicles 100. The identification information of the kind of the initial equipment of vehicles 100 is the same as that used in the vehicle management information table.

What is stored in the additional item fields is identification information of additional items. The equipment setting table includes additional item fields as many as additional items. In the case where no additional item is necessary, the additional item field is blank. The identification information of additional items is the same as that used in the item management information table.

The equipment setting table in FIG. 6 indicates that the equipment of the vehicle 100 is determined according to the section to which the user belongs and his/her job. Note that the fields in the equipment setting table in FIG. 6 are given as illustrative examples. The fields in the equipment setting table are not limited to those in FIG. 6.

FIG. 7 illustrates an example of an item equipment information table. The item equipment information table is stored in, for example, storage (not illustrates) in the microcomputer constituting the control unit 103 of each vehicle 100. The item equipment information table is a table that holds information about items with which the vehicle 100 is equipped or planned to be equipped. The item equipment information table is created by the operation plan control unit 1031 in cases where an operation command received from the center server 400 includes information about an additional item(s) or where a request for addition of an additional item(s) is input by a user.

The item equipment information table includes the fields of, for example, item ID, location, and equipment status. What is stored in the item ID field is identification information of items with which the vehicle 100 is equipped or planned to be equipped. What is stored in the location field is information specifying the location of each item. The location of an item is, for example, the return place of that item or the place of transfer from a vehicle 100 equipped with that item. Information specifying the location of the item may be an address, longitude and latitude, or identification information of a building (e.g. identification information of a branch office, garage, or warehouse). The identification information of items and the location of items are included in, for example, an operation command received from the center server 400 or item transfer information. The operation command includes a designation of the location of an item as a stopover place or a destination.

What is stored in the equipment status field is information indicating whether or not the vehicle 100 is equipped with each item. In the equipment status field, information indicating that the vehicle 100 is equipped with an item is, for example, "equipped". In the equipment status field, information indicating that the vehicle 100 is not equipped with an item is, for example, "not equipped" and "already returned".

For example, the initial value of the equipment status field is "not equipped". In other words, "not equipped" is stored in the equipment status field until the item is loaded onto the vehicle 100. When the item is loaded onto the vehicle 100, "equipped" is input to the equipment status field. Loading of the item onto the vehicle 100 is detected by a user's input of a notice indicating the completion of loading of the item to the vehicle 100.

When, for example, the item is returned to the return place or transferred to another vehicle 100, "already returned" is input to the equipment status field. Returning of the item to the return place is detected, for example, by a usage user's input of a notice indicating the completion of returning of the item to the vehicle 100. Transfer of the item to another vehicle 100 is detected by, for example, a usage user's input to the vehicle 100 of a notice indicating the completion of transfer of the item. The detection of equipment or return of an item may be conducted on the basis of information acquired by a certain kind of sensor, such as a weight sensor or a camera that the vehicle 100 has.

Note that he fields in the item equipment information table in FIG. 7 are given as illustrative examples. The fields in the item equipment information table are not limited to those in FIG. 7.

<Flow of Process>

Figure 8:
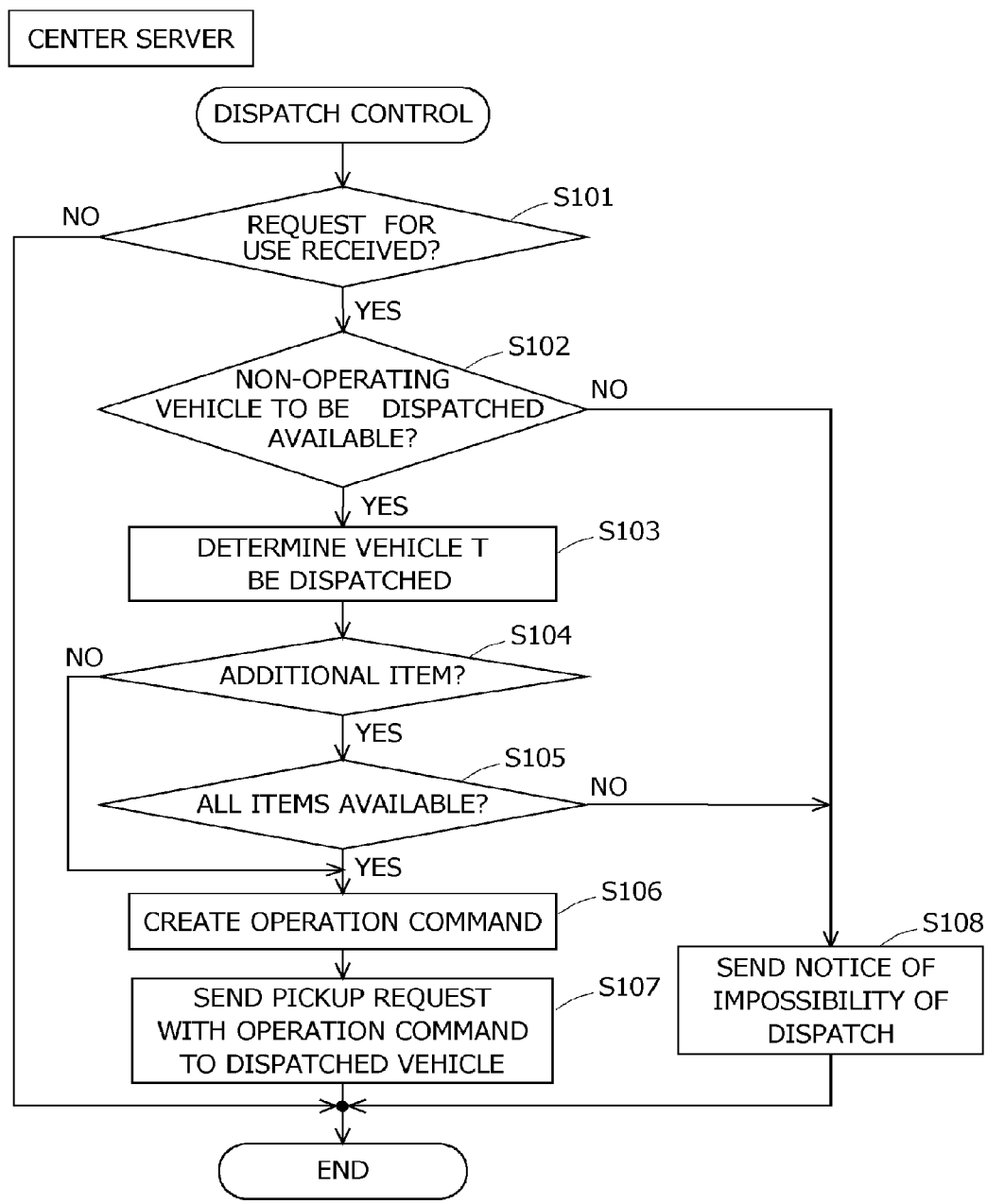
FIG. 8 is an exemplary flow chart of a dispatch control process executed in the center server.

FIG. 8 is an exemplary flow chart of a vehicle dispatch control process executed in the center server 400. The vehicle dispatch control process is the process of dispatching a vehicle 100 to a pickup place in response to a request for use. The process illustrated in FIG. 8 is executed repeatedly, for example, at predetermined intervals. The subject that executes the process is the processor in the center server 400. However, for the sake of convenience, a functional unit will be described as the subject that executes a process. In the following description of processes executed in the center server 400 illustrated in some flow charts also, a functional unit will be described as the subject.

In step S101, the operation control unit 4022 determines whether or not a request for use has been received. The request for use is sent from, for example, a user terminal 50 through the job management server 500. The request for use includes the identification information of the usage user who wants to get on the vehicle 100, information about the pickup place and the pickup date and time. Note that the usage user may be either the same user who made the request for use or a user different from the user who made the request for use. If an affirmative determination is made in step S101, the process proceeds to step S102. If a negative determination is made in step S101, the process illustrated in FIG. 8 is ended.

In step S102, the operation control unit 4022 consults the vehicle management information table (FIG. 3) to determine whether or not there is a vehicle of which the transportation service status field indicates "not operating". This is the processing for determining whether or not there is a vehicle 100 that can be dispatched now. If an affirmative determination is made in step S102, the process proceeds to step S103. If a negative determination is made in step S102, the process proceeds to step S108. In step S108, the operation control unit 4022 sends a notice that a vehicle cannot be dispatched to the user terminal 50 that has made the request for use, through the job management server 500. Thereafter, the process illustrated in FIG. 8 is ended.

In step S103, the operation control unit 4022 determines the vehicle 100 to be dispatched to the pickup place designated by the request for use. This vehicle will be hereinafter referred to as the "dispatched vehicle". In the system according to the first embodiment, the processing of step S103 is executed in the following way. For example, the operation control unit 4022 retrieves from the user attribute information table (FIG. 4) a combination of identification information of the section and the job type associated with the identification information of the usage user. Then, the operation control unit 4022 retrieves from the equipment setting table (FIG. 6) the identification information of the initial equipment associated with the combination of identification information of the section and the job type of the usage user. Then, the operation control unit 4022 consults the vehicle management information table (FIG. 3) to find the identification information of a vehicle 100 of which the identification information indicated by the vehicle ID field is associated with the identification information of the initial equipment associated with the combination of identification information of the section and the job type of the usage user and the transportation field indicates "not operating". The vehicle 100 found in this way is determined as the dispatched vehicle. In cases where a plurality of vehicles 100 are found in the above process, the dispatched vehicle 100 may be determined, for example, on the basis of the current position and the vehicle type of the vehicles 100. In the case where the dispatched vehicle is determined on the basis of the current position of the vehicles 100, the vehicle 100 whose current position is nearest to the pickup place may be selected as the dispatched vehicle.

In step S104, the operation control unit 4022 consults the equipment setting table (FIG. 6) to determine whether or not there is an additional item(s) associated with the combination of the section and the job type of the usage user. If an affirmative determination is made in step S104, the process proceeds to step S105. If a negative determination is made, the process proceeds to step S106.

In step S105, the operation control unit 4022 determines whether or not all of the additional items are available. Specifically, for example, the operation control unit 4022 consults the item management information table (FIG. 5), and if the values in the item-equipped vehicle ID fields associated with the identification information of the respective additional items are blank, it is determined that all of the additional items are available. If an affirmative determination is made in step S105, the process proceeds to step S106. If a negative determination is made in step S105, the process proceeds to step S108. In step S108, the operation control unit 4022 sends a notice that a vehicle cannot be dispatched to the user terminal 50 that has made the request for use, through the job management server 500. Then, the process illustrated in FIG. 8 is ended.

In step S106, the operation control unit 4022 creates an operation command designating the pickup place designated by the request for use as the destination. The operation command created in step S106 is sent with a pickup request. In the case where additional item are requested, the operation command includes information about the return places of the additional items as stopover places and the identification information of the additional items that should be loaded at the respective stopover places. The operation command may also include information about the pickup date and time, the identification information of the usage user, and authentication information used for authentication of the usage user.

In step S107, the operation control unit 4022 sends the operation command and the pickup request created as above to the vehicle 100 selected as the dispatched vehicle. Thereafter, the process illustrated in FIG. 8 is ended.

In the illustrative case illustrated in FIG. 8, if in step S105, the values of the item-equipped vehicle ID fields associated with the identification information of the respective additional items associated with the section and the job type of the usage user are blank in the item management information table (FIG. 5), in other words, if the locations of all of those additional items are the return places, it is determined that all of the additional items are available, and the return places of the respective additional items are set as the stopover places of the dispatched vehicle. However, this is not essential. For example, it may be determined that the additional items are available, if the item management information table (FIG. 5) states that additional items associated with the section and the job type of the usage user are provided in other vehicles 100, and the vehicle management information table (FIG. 3) states that the transportation service fields associated with the identification information of those other vehicle 100 indicate "not operating", in other words, the locations of the additional items are other vehicles 100 and those other vehicles 100 are not operating in transportation service. In that case, the places of transfer between the vehicles 100 are set as stopover places, which are included in the operation command. In connection with this, the places of transfer of the additional items may be determined by a process illustrated in FIG. 10 that will be described later.

The request for use may include a designation of initial equipment and additional items by the requesting user. In the case where the request for use includes a designation of initial equipment and additional items, for example, a vehicle 100 provided with the initial equipment designated by the request for use may be selected as the dispatched vehicle in step S103. The items to be loaded onto the dispatched vehicle, for which a determination as to the availability is made in step S105, may be either or both of the additional items designated in the request for use and the additional items associated with the section and the job type of the usage user in the equipment setting table (FIG. 6).

Figure 9:
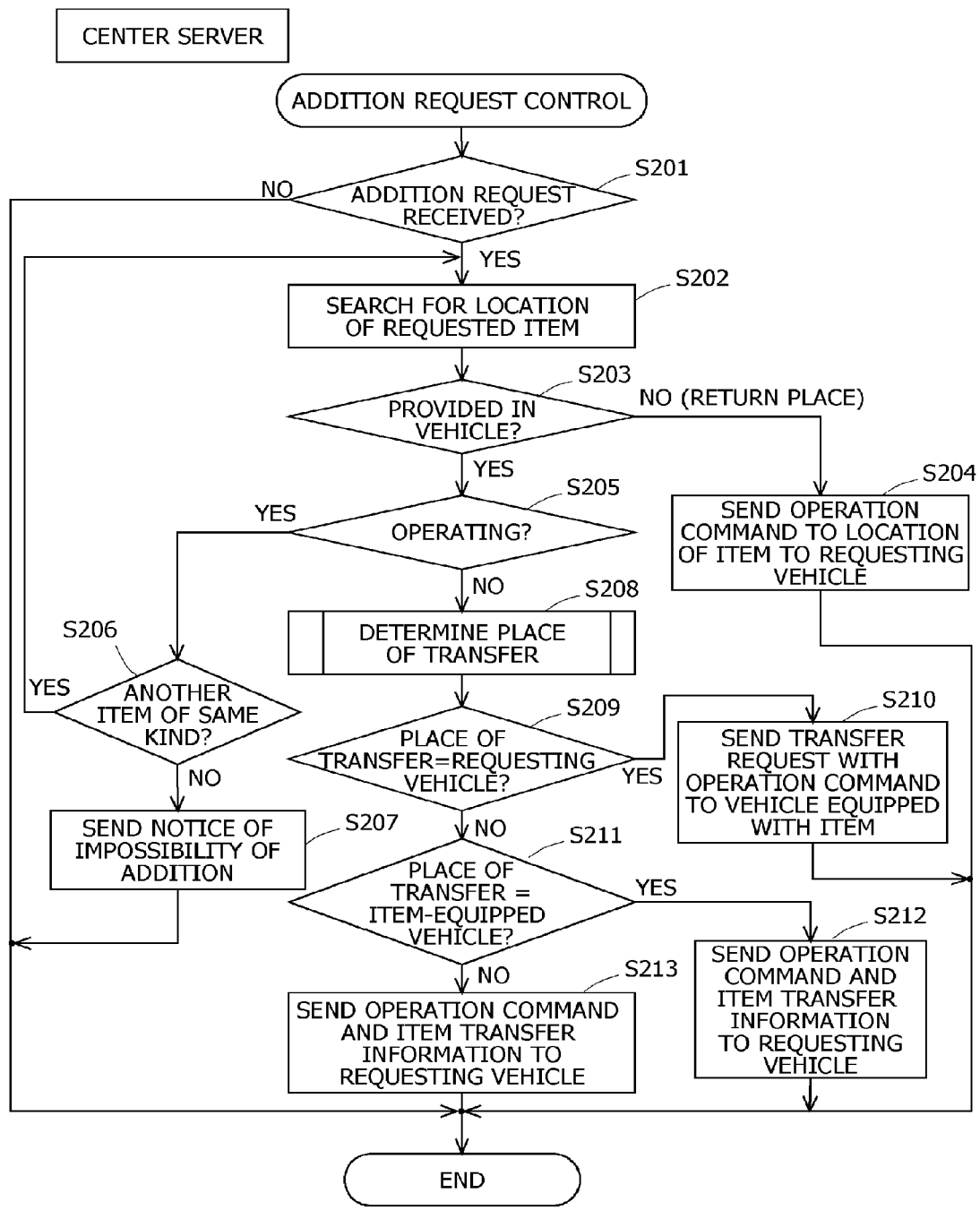
FIG. 9 is an exemplary flow chart of an addition request control process executed in the center server.

FIG. 9 is an exemplary flow chart of an addition request control process executed in the center server 400. The addition request control process is executed, for example, under transportation service operation, in other words, when an item addition request is received from a vehicle 100 with a usage user aboard. The process illustrated in FIG. 9 is executed repeatedly, for example, at predetermined intervals.

In step S201, the operation control unit 4022 determines whether or not an item addition request has been received. The item addition request includes information about the requested additional item(s), the identification information of the usage user who made the request, and the identification information of the vehicle 100. If an affirmative determination is made in step S201, the process proceeds to step S202. If a negative determination is made, the process illustrated in FIG. 9 is end.

In step S202, the operation control unit 4022 searches for the location of the additional item. The location of the additional item is retrieved from, for example, the item management information table (FIG. 5). If there are plurality of items of the kind same as the additional item, an item of the kind same as the additional item may be selected in step S202, for example, in the order from above to below in the item management information table (FIG. 5), or higher priority in selection may be given to items of which the item-equipped vehicle ID field is blank or items of which the location is close to the current position of the vehicle 100 that has made the request.

In step S203, the operation control unit 4022 determines whether or not the location of the additional item is another vehicle 100, in other words whether or not another vehicle 100 is equipped with the additional item. If an affirmative determination is made in step S203, the process proceeds to step S205. If the location of the additional item is the return place, step S203 is answered in the negative. If a negative determination is made in step S203, the process proceeds to step S204.

In step S204, since the location of the additional item is the return place, the operation control unit 4022 creates an operation command designating the return place of the additional item as the destination and sends it to the vehicle 100 that has made the request. When the vehicle 100 that has made the request receives this operation command, it travels to the return place of the item. Thereafter, the process illustrated in FIG. 9 is ended.

The processing of step S205 and the subsequent steps is performed in the case where the requested item is provided in another vehicle 100. In step S205, the operation control unit 4022 consults the vehicle management information table (FIG. 3) to determine whether or not the transportation service status field associated with the identification information of the vehicle 100 equipped with the requested item (which will be referred to as the item-equipped vehicle) indicates "operating". If an affirmative determination is made in step S205, the process proceeds to step S206. If a negative determination is made in step S205, the process proceeds to step S208.

In step S206, since the item-equipped vehicle equipped with the requested item is operating in transportation service, the operation control unit 4022 determines whether or not there is another item of the kind same as the requested item. If an affirmative determination is made in step S206, the process proceeds to step S202, and the processing of step S202 and the subsequent steps is executed with respect to another item of the same kind. If a negative determination is made in step S206, the process proceeds to step S207. In step S207, the operation control unit 4022 sends a notice that the addition of the item is impossible to the vehicle 100. Thereafter, the process illustrated in FIG. 9 is ended.

The processing of step S208 and the subsequent steps is executed in the case where the item-equipped vehicle equipped with the requested item is not operating in transportation service. In step S208, the operation control unit 4022 determines the place of transfer of the requested item. Details of the process of determining the place of transfer of the requested item will be described later. The place of transfer of the requested item is determined to one of the vehicle 100 that has made the request, the item-equipped vehicle, and the return place of the requested item, in the process of determining the place of transfer that will be described later.

In step S209, the operation control unit 4022 determines whether or not the place of transfer of the requested item is the present position of the vehicle 100 that has made the request. If a negative determination is made in step S209, the process proceeds to step S211. If affirmative determination is made in step S209, the process proceeds to step S210. In step S210, the operation control unit 4022 sends to the vehicle equipped with the requested item an operation command designating the current position of the vehicle 100 that has made the request as the destination and a transfer request. The transfer request includes, for example, the identification information of the item to be transferred, the identification information of the vehicle 100 to which the requested item is to be transferred, and the identification information of the usage user. Then, after receiving the operation command, the item-equipped vehicle moves to the current position of the vehicle 100 that has made the request, which is the place of transfer, and the requested item is transferred from the item-equipped vehicle to the vehicle 100 that has made the request. The actual work of transfer is conducted by, for example, the usage user on the vehicle 100 that has made the request.

In step S211, the operation control unit 4022 determines whether or not the place of transfer of the requested item is the current position of the vehicle equipped with the requested item. If a negative determination is made in step S211, the process proceeds to step S213. If an affirmative determination is made in step S211, the process proceeds to step S212. In step S212, where the operation control unit 4022 sends to the vehicle 100 that has made the request an operation command designating the current position of the vehicle equipped with the requested item as the destination and item transfer information about the requested item. The item transfer information includes, for example, the identification information of the item to be transferred, the identification information of the vehicle 100 from which that item is to be transferred, and information about the location of that item (e.g. the identification information of the item-equipped vehicle). Then, after receiving the operation command, the vehicle 100 that has made the request moves to the current position of the item-equipped vehicle, which is the place of transfer, and the requested item is transferred from the item-equipped vehicle to the vehicle 100 that has made the request.

In step S231, because steps S209 and S211 have been answered in the negative, meaning that the place of transfer of the requested item is a place other than the current position of the vehicle 100 that has made the request or the current position of the item-equipped vehicle, the operation control unit 4022 sends to both the vehicle 100 that has made the request and the item-equipped vehicle an operation command designating the place of transfer as the destination. In step S213 moreover, the operation control unit 4022 sends item transfer information to the vehicle 100 that has made the request together with the operation command, and a transfer request to the item-equipped vehicle together with the operation command. Thereafter, the process illustrated in FIG. 9 is ended.

In steps S210 and S212, the operation control unit 4022 may send to the vehicle 100 that has made the request or the item-equipped vehicle that serves as the place of transfer a standby command or a movement suspension command in order for its current position not to change.

In cases where there is a plurality of requested items, the operation control unit 4022 may execute the process, for example, in the following way. In step S202, the operation control unit 4022 determines the locations of the respective requested items and selects the item of which the location is closest to the current position of the vehicle 100 that has made the request. The operation control unit 4022 executes the processing of step S203 and the subsequent steps with respect to the selected item. After that item is loaded onto the vehicle 100 that has made the request, the operation control unit 4022 selects the next item for further processing, and the above-described processing is repeated. The loading of a requested item onto the vehicle 100 that has made the request may be detected by, for example, a notice of completion of loading from that vehicle 100. Alternatively, the vehicle 100 that has made the request may be configured to send a request for notification of the place of transfer of the next requested item to the center server 400 so that the loading of the requested item can be detected by reception of that request.

Figure 10:
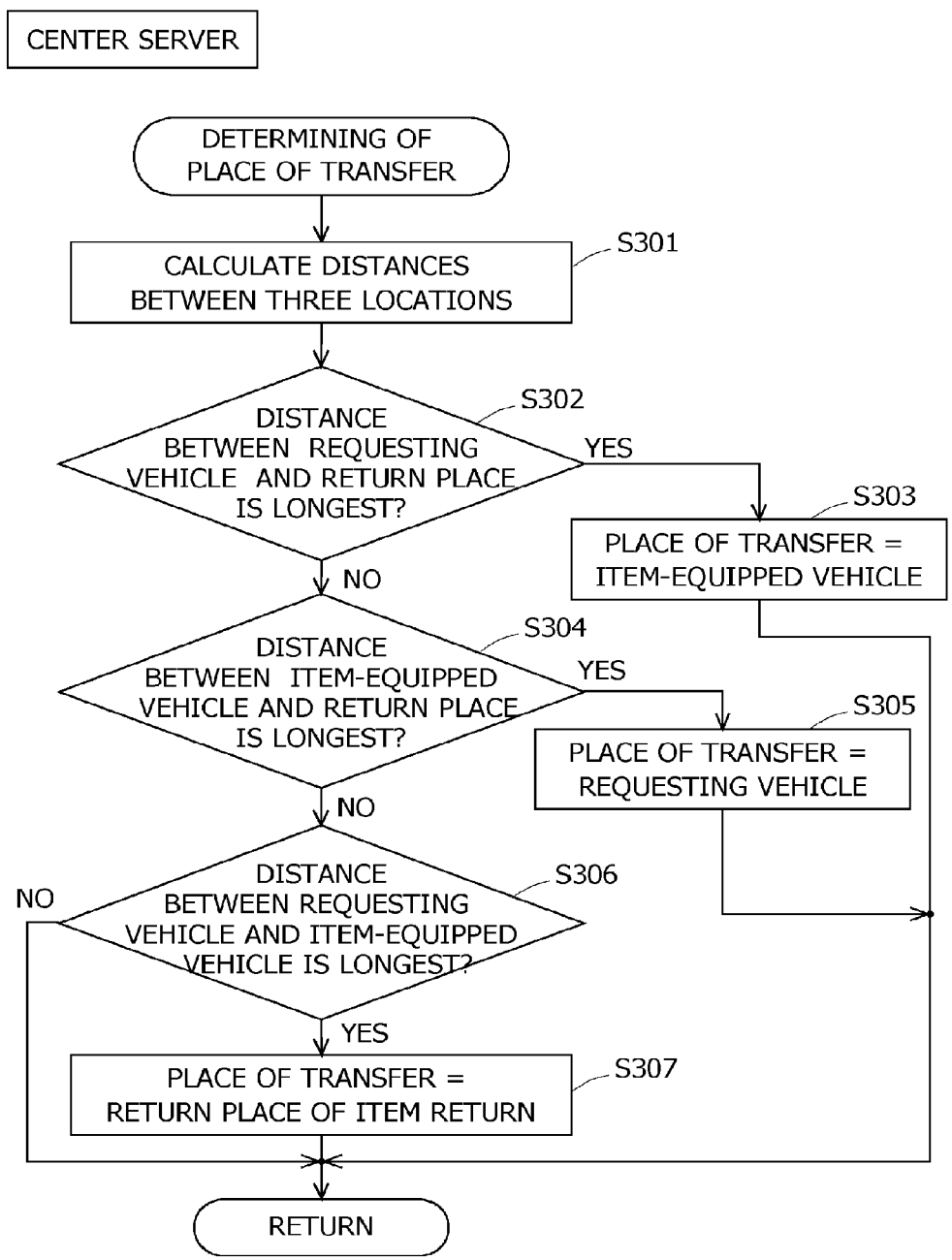
FIG. 10 is an exemplary flow chart of a process for determining the place of transfer executed in the center server.

FIG. 10 is an exemplary flow chart of a process for determining the place of transfer executed in the center server 400. The process illustrated in FIG. 10 corresponds to, for example, the process of step S208 in FIG. 9. The process illustrated in FIG. 10 is started, for example, when it is called from the main routine illustrated in FIG. 9.

In step S301, the operation control unit 4022 calculates the distances between three locations, which are the current position of the vehicle 100 that has made the request, the current position of the item-equipped vehicle equipped with the requested item, and the return place of the requested item.

In step S302, the operation control unit 4022 determines whether the longest distance among the distances between the aforementioned three locations is the distance between the current position of the vehicle 100 that has made the request and the return position of the requested item. If a negative determination is made in step S302, the process proceeds to step S304. If an affirmative determination is made in step S302, the process proceeds to step S303. In step S303, the operation control unit 4022 sets the place of transfer of the requested item to the current position of the item-equipped vehicle. This is because in the case where the longest distance among the distances between the aforementioned three locations is the distance between the current position of the vehicle 100 that has made the request and the return position of the requested item, when seen from the vehicle 100 that has made the request, the current position of the item-equipped vehicle is on the side of the return place of the requested item, and the current position of the item-equipped vehicle is nearer than the return place of the requested item. Thereafter, the process illustrated in FIG. 10 is ended. Then, for example, the process proceeds to step S209 in the process illustrated in FIG. 9.

In step S304, the operation control unit 4022 determines whether or not the longest distance among the distances between the aforementioned three locations is the distance between the current position of the item-equipped vehicle and the return position of the requested item. If a negative determination is made in step S304, the process proceeds to step S306. If an affirmative determination is made in step S304, the process proceeds to step S305. In step S305, the operation control unit 4022 sets the place of transfer of the requested item to the current position of the vehicle 100 that has made the request. This is because in the case where the longest distance among the distances between the aforementioned three locations is the distance between the current position of the item-equipped vehicle and the return position of the requested item, when seen from the vehicle 100 that has made the request, the current position of the item-equipped vehicle is on the side opposite to the return place of the requested item, and it is probable that the item-equipped vehicle is moving toward the place of return of the requested item, because the service operation of the item-equipped vehicle has been ended. Thereafter, the process illustrated in FIG. 10 is ended. Then, for example, the process proceeds to step S209 in the process illustrated in FIG. 9.

In step S306, the operation control unit 4022 determines whether or not the longest distance among the distances between the aforementioned three locations is the distance between the current position of vehicle 100 that has made the request and the current position of the item-equipped vehicle. If a negative determination is made in FIG. S306, the process illustrated in FIG. 10 is ended. Then, for example, the process proceeds to step S209 in the process illustrated in FIG. 9. In that case, the place of transfer is not determined, and, for example, an error code is returned.

If an affirmative determination is made in step S306, the process proceeds to step S307, where the operation control unit 4022 sets the place of transfer of the requested item to the return place of the requested item. This is because in the case where the longest distance among the distances between the aforementioned three locations is the distance between the current position of vehicle 100 that has made the request and the current position of the item-equipped vehicle, when seen from the vehicle 100 that has made the request, the current position of the item-equipped vehicle is on the side of the return place of the requested item, and the return place of the requested item is nearer than the current position of the item-equipped vehicle. Thereafter, the process illustrated in FIG. 10 is ended. Then, for example, the process proceeds to step S209 in the process illustrated in FIG. 9.

Note that the process of determining the place of transfer illustrated in FIG. 10 has been described as an example. The method of determining the place of transfer is not limited to the above-described example illustrated in FIG. 10. In cases where the vehicle 100 that has made the request or the item-equipped vehicle is moving, the current position thereof serving as the place of transfer will change. In such cases, the operation control unit 4022 may send to the vehicle 100 that has made the request or the item-equipped vehicle an operation command that causes it to move a place where it can be parked in step S303 or S305.

The place of transfer of the item is not limited to the current position of the vehicle 100 that has made the request, the current position of the item-equipped vehicle, or the return place of the requested item. The place of transfer may be set by an administrator of the system to any place suitable for the mode of implementation of the system. For example, the place of transfer may be set to a location between the current position of the vehicle 100 that has made the request and the current position of the item-equipped vehicle.

While in the process illustrated in FIG. 10, the place of transfer of the requested item is determined on the basis of the longest distance between two locations among the distances between three locations including the current position of the vehicle 100 that has made the request, the current position of the item-equipped vehicle equipped with the requested item, and the return place of the requested item, the factors used to determine the place of transfer of the requested item is not limited to this. For example, the place of transfer may be determined, for example, on the basis of relationship among the distances between three locations including the current position of the vehicle 100 that has made the request, the current position of the item-equipped vehicle equipped with the requested item, and the return place of the requested item. Alternatively, the place of transfer may be determined, for example, taking into consideration the direction toward the destination of the vehicle 100 that has made the request in addition to the distances between three locations including the current position of the vehicle 100 that has made the request, the current position of the item-equipped vehicle equipped with the requested item, and the return place of the requested item. Still alternatively, the place of transfer may be determined, for example, taking into consideration whether the vehicle 100 that has made the request or the item-equipped vehicle is being parked in addition to the distances between three locations including the current position of the vehicle 100 that has made the request, the current position of the item-equipped vehicle equipped with the requested item, and the return place of the requested item.

Figure 11:
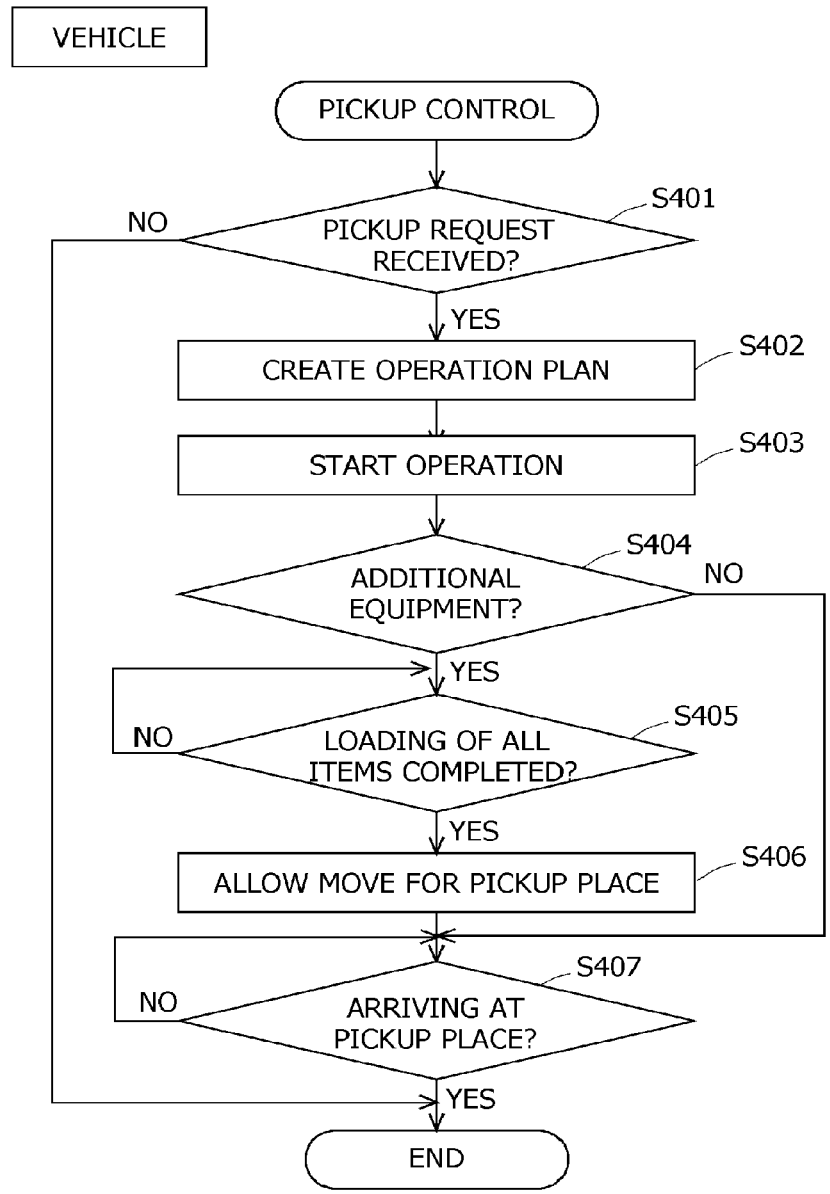
FIG. 11 is an exemplary flow chart of a pickup control process executed in the vehicle.

FIG. 11 is an exemplary flow chart of a pickup control process executed in a vehicle 100. The pickup control process is a process executed in a vehicle 100 having received an operation command from the center server 400 to travel to a designated pickup place. The process illustrated in FIG. 11 is executed repeatedly, for example, at predetermined intervals. The subject that executes the process illustrated in FIG. 11 is a microcomputer that constitutes the control unit 103 of the vehicle 100. However, for the sake of convenience, the operation plan control unit 1031 as a functional unit will be described as the subject that executes the process. In the following description of processes executed in the vehicle 100 also, a functional unit will be described as the subject.

In step S401, the operation plan control unit 1031 determines whether or not a pickup request has been received. A pickup request is received together with an operation command. If an affirmative determination is made in step S401, the process proceeds to step S402. If a negative determination is made in step S401, the process illustrated in FIG. 11 is ended.

In step S402, the operation plan control unit 1031 creates an operation plan. The operation command received in step S401 includes information about a destination, that is, the pickup place. In cases where there are additional items to be added, the operation command further includes information about stopover places and information about items to be loaded at the respective stopover places. The operation plan control unit 1031 creates as an operation plan a route to the pickup place via the stopover places on the basis of the information included in the operation command. The route may be created using any known technology. The operation plan also specifies the tasks of loading the items designated by the operation command to be done at the stopover places. In step S402, if there is an additional item to be added, the operation plan control unit 1031 creates an item equipment information table (FIG. 7) on the basis of the operation command. In step S403, the operation plan control unit 1031 starts the operation in accordance with the operation plan created as above.

Subsequently, the vehicle 100 travels to the pickup place in accordance with the operation plan, and in cases where additional items are to be added, the additional items are loaded onto the vehicle 100 at the stopover places where the additional items are present. Loading of the items onto the vehicle 100 at the stopover places is performed by a user who manages items at each stopover place or a machine for loading items. When detecting loading of an item, the operation plan control unit 1031 accesses the item equipment information table (FIG. 7) to change the equipment status field associated with the identification information of that item to "equipped".

In step S404, the operation plan control unit 1031 determines whether or not there is an additional item to be added. If an affirmative determination is made in step S404, the process proceeds to step S405. If a negative determination is made in step S404, the process proceeds to step S407. In step S405, the operation plan control unit 1031 determines whether or not loading of all the additional items has been completed. Step S405 is answered in the affirmative, for example, if all the equipment status fields in the item equipment information table (FIG. 7) indicate "equipped". If an affirmative determination is made in step S405, the process proceeds to step S406. If a negative determination is made in step S405, the processing of step S405 is executed again.

In step S406, the operation plan control unit 1031 allows the vehicle 100 to start to move for the pickup place, since the vehicle 100 is already equipped with all the additional items. In step S407, the operation plan control unit 1031 determines whether or not the vehicle 100 has arrived at the pickup place. The arrival at the pickup place is detected, for example, on the basis of the position information or by an input of a notice of completion of pickup by the usage user aboard the vehicle 100. If an affirmative determination is made in step S407, the process illustrated in FIG. 11 is ended. If a negative determination is made in step S407, the processing of step S407 is executed again.

Figure 12:
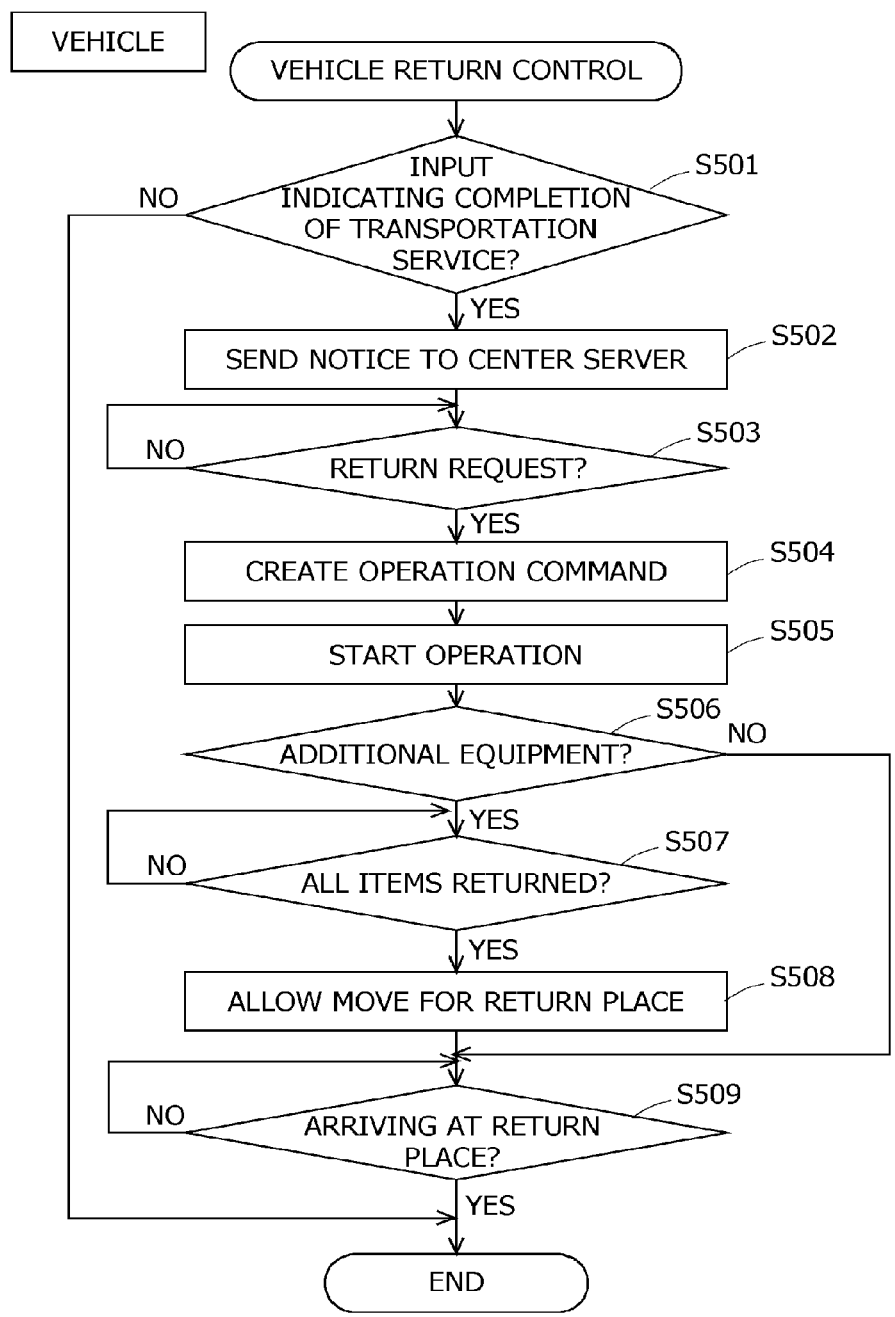
FIG. 12 is an exemplary flow chart of a vehicle return control process executed in the vehicle.

FIG. 12 is an exemplary flow chart of a vehicle return control process executed in the vehicle 100. The vehicle return control process is the process for returning the vehicle 100 to the return place after the completion of transportation service by the vehicle 100. The process illustrated in FIG. 12 is executed repeatedly, for example, at predetermined intervals.

In step S501, the operation plan control unit 1031 determines whether or not an input indicating the completion of transportation service is made. An input indicating the completion of transportation service is performed by, for example, the usage user aboard the vehicle 100. If an affirmative determination is made in step S501, the process proceeds to step S502. If a negative determination is made in step S501, the process illustrated in FIG. 12 is ended.

In step S502, the operation plan control unit 1031 sends a notice of completion of transportation service to the center server 400. When receiving the notice of completion of transportation service from the vehicle 100, the operation control unit 4022 of the center server 400 retrieves information about the items with which the vehicle 100 is equipped from, for example, the item management information table (FIG. 5) and sends to the vehicle 100 an operation command designating the return places of the items thus acquired as stopover places and the return place of the vehicle 100 as the destination. The center server 400 also sends a return request together with the operation command. Moreover, the center server 400 accesses the vehicle management information table (FIG. 3) to change the transportation service field associated with the vehicle 100 to "not operating".

In step S503, the operation plan control unit 1031 determines whether or not a return request has been received from the center server 400. If an affirmative determination is made in step S503, the process proceeds to step S504. If a negative determination is made in step S503, the processing of step S503 is executed again. An operation command is also received with the return request.

In step S504, the operation plan control unit 1031 creates an operation plan by creating a route to the return position of the vehicle 100 as a stopover place on the basis of the operation command. The operation plan also specifies the tasks of unloading the items designated by the operation command to be done at the stopover places (i.e. the return places of the items).

In step S505, the operation plan control unit 1031 starts the operation in accordance with the operation plan created as above. Subsequently, the vehicle 100 travels to the return place of the vehicle 100 in accordance with the operation plan, and in cases where the vehicle 100 is equipped with additional items, the additional items are unloaded from the vehicle 100 at the stopover places set to the return places of the additional items. Unloading of the items from the vehicle 100 at the stopover places is performed by a user who manages items at each stopover place or a machine. When detecting unloading of an item, the operation plan control unit 1031 accesses the item equipment information table (FIG. 7) to change the equipment status field associated with the identification information of that item to "returned" and sends a notice of completion of return to the center server 400. Consequently, in the center server 400, the item-equipped vehicle ID field associated with that item in the item management information table is updated to blank, so that the location of that item is recognized as its return place.

In step S506, the operation plan control unit 1031 determines whether or not there is an additional item. If an affirmative determination is made in step S506, the process proceeds to step S507. If a negative determination is made in step S506, the process proceeds to step S509. In step S507, the operation plan control unit 1031 determines whether or not return of all the additional items has been completed. Step S507 is answered in the affirmative, for example, if all the equipment status fields in the item equipment information table (FIG. 7) indicate "returned". If an affirmative determination is made in step S507, the process proceeds to step S508. If a negative determination is made in step S507, the processing of step S507 is executed again.

In step S508, the operation plan control unit 1031 allows the vehicle 100 to start to move for the return place of the vehicle 100, since all the items loaded on the vehicle 100 have already been returned. In step S509, the operation plan control unit 1031 determines whether or not the vehicle 100 has arrived at the return place. If an affirmative determination is made in step S509, the process illustrated in FIG. 12 is ended. If a negative determination is made in step S509, the processing of step S509 is executed again.

Note that the processes executed in the vehicle 100 are not limited to those illustrated in FIGS. 11 and 12. For example, the operation command sent with a pickup request may include information about the return places of items in addition to the locations of the items designated as stopover places. In that case, the vehicle 100 can create, in the vehicle return control process, an operation plan designating the return places of the items as stopover places without need to receive a return request from the center server 400.

Figure 13:
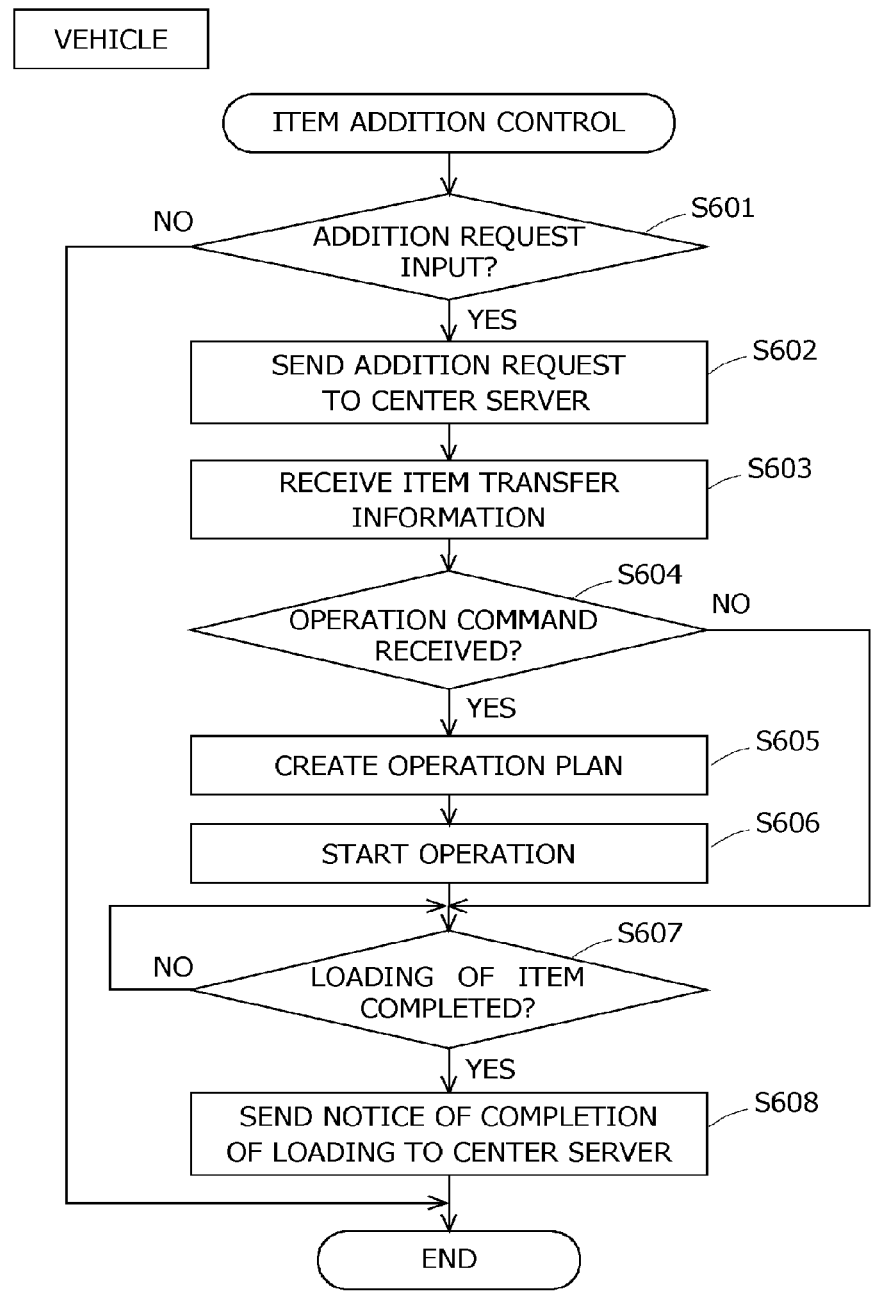
FIG. 13 is an exemplary flow chart of an item addition control process executed in the vehicle.

FIG. 13 is an exemplary flow chart of an item addition control process executed in the vehicle 100. The item addition control process is executed when a request for addition of an item(s) (item addition request) is input to the vehicle 100 by the usage user. The process illustrated in FIG. 13 is executed repeatedly, for example, at predetermined intervals.

In step S601, the operation plan control unit 1031 determines whether or not an item addition request is input by the usage user through the input-output unit 106. The usage user also inputs information about an additional item(s) he/she wants through the input-output unit 106 together with the item addition request. If an affirmative determination is made in step S601, the process proceeds to step S602. If a negative determination is made in step S601, the process illustrated in FIG. 13 is ended.

In step S602, the operation plan control unit 1031 sends an item addition request to the center server 400. The operation plan control unit 1031 also sends the information about the items the usage user wants input by the usage user to the center server 400 together with the item addition request. When receiving the item addition request, the center server 400 executes, for example, the addition request control process described above with reference to FIG. 9 to send to the vehicle 100 that has made the request item transfer information and, in the case where it is necessary for the vehicle 100 to move to a place of transfer, an operation command.

In step S603, the operation plan control unit 1031 receives the item transfer information from the center server 400. The item transfer information includes, for example, the identification information of the item to be loaded, the identification information of the vehicle 100 from which the item is to be transferred (in cases where another vehicle 100 is equipped with that item), and information about the location of the item. In the case where a plurality of items is to be added, the operation command includes information about stopover places as the places of transfer and information about the items.

In step S604, the operation plan control unit 1031 determines whether or not an operation command has been received from the center server 400. The operation command designates the place of transfer of the item to be added as the destination. If an affirmative determination is made in step S604, the process proceeds to step S605. If a negative determination is made in step S604, the process proceeds to step S607. If a negative determination is made in step S604, it means that the place of transfer of the item is the vehicle 100 that has made the request, and the vehicle 100 equipped with the requested item to be added will come to the vehicle 100 that has made the request.

In step S605, the operation plan control unit 1031 creates an operation plan. The operation plan control unit 1031 creates as an operation plan a route to the place of transfer of the item on the basis of information included in the operation command. The route may be created using any known technology. The operation plan also specifies the task of loading the item(s) to be done at the place of transfer (the destination or stopover place). The operation plan control unit 1031 creates an item equipment information table (FIG. 7) on the basis of the operation command. In step S606, the operation control unit 1031 starts the operation based on the operation plan created as above.

In step S607, the operation plan control unit 1031 determines whether or not loading of the item requested by the item addition request has been completed. Step S607 is answered in the affirmative, for example, if the equipment status field in the item equipment information table (FIG. 7) associated with the identification information of the item requested by the item addition request indicates "equipped". If an affirmative determination is made in step S607, the process proceeds to step S608. If a negative determination is made in step S607, the processing of step S607 is executed again. In cases where the completion of loading of the item requested by the item addition request is not detected after the lapse of a certain time long enough for the vehicle 100 to arrive at the place of transfer, the operation control unit 1031 may, for example, notify the center server 400 of that fact to receive information of another item of the same kind and/or an operation command to the place of transfer of that another item.

In step S608, the operation plan control unit 1031 sends a notice of completion of loading of the additional item to the center server 400. When receiving the notice of completion of loading, the center server 400, for example, accesses the item management information table (FIG. 5) to update the value of the item-equipped vehicle ID field associated with the identification information of the additional item to the identification information of the vehicle 100 that has made the request. Thereafter, the process illustrated in FIG. 13 is ended.

Note that the item addition control process illustrated in FIG. 13 is executed, for example, as an interrupt, and after the end of the item addition control process, the process that was under execution before the start of the item addition process is resumed.

Figure 14:
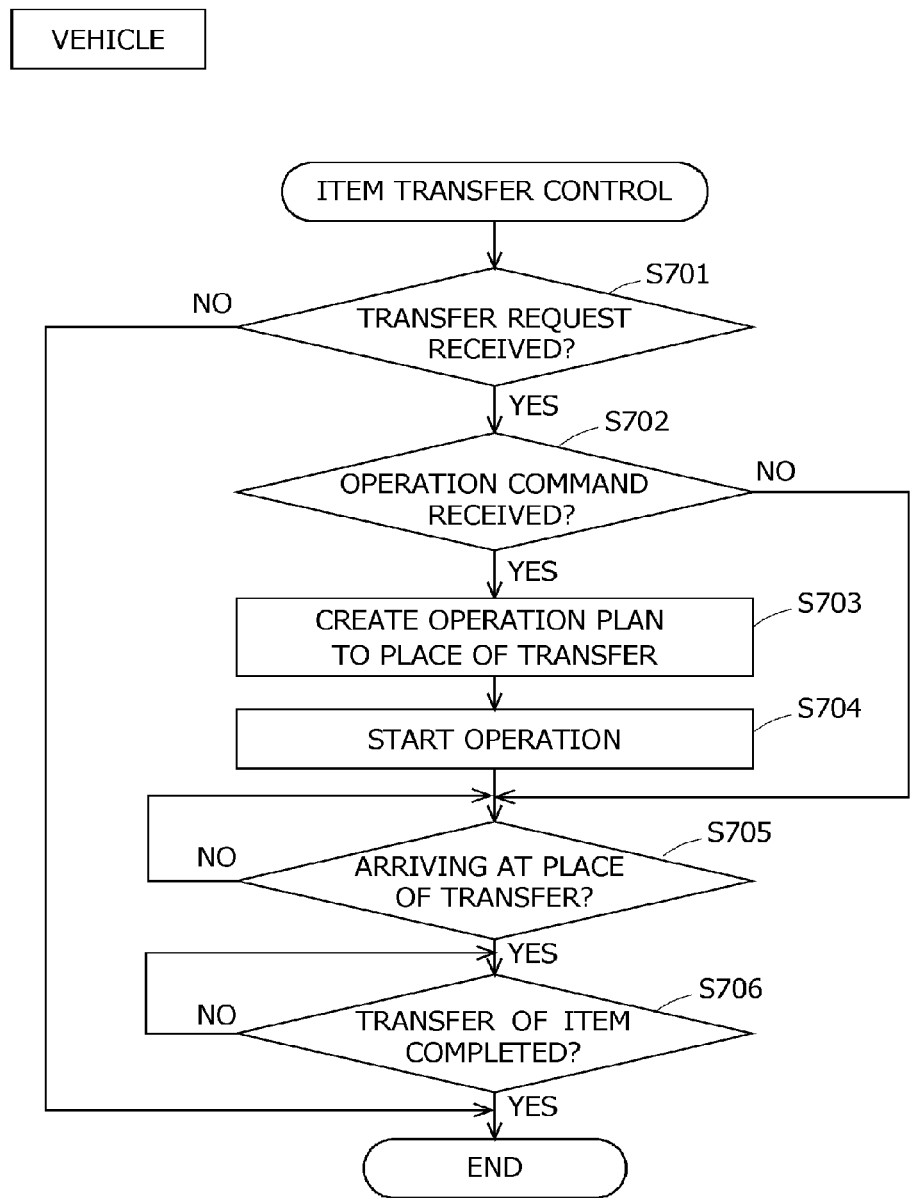
FIG. 14 is an exemplary flow chart of an item transfer control process executed in the vehicle.

FIG. 14 is an exemplary flow chart of an item transfer control process executed in the vehicle 100. The item transfer control process is the process of transferring, in cases where an item addition request is made in another vehicle 100, an item with which the vehicle 100 is equipped to the vehicle 100 that has made the request. The process illustrated in FIG. 14 is executed repeatedly, for example, at predetermined intervals.

In step S701, the operation control unit 1031 determines whether or not a transfer request has been received from the center server 400. The transfer request includes information about the item to be transferred with which the vehicle 100 is equipped, information about the vehicle 100 to which the item is to be transferred, and information about the place of transfer. If an affirmative determination is made in step S701, the process proceeds to step S702. If a negative determination is made in step S701, the process illustrated in FIG. 14 is ended. The vehicle 100 that has made the request is same vehicle 100 as the vehicle 100 which to which the item is to be transferred.

In step S702, the operation plan control unit 1031 determines whether or not an operation command has been received from the center server 400. The operation command designates as the destination the place of transfer of the item to be transferred. If an affirmative determination is made in step S702, the process proceeds to step S703. If a negative determination is made in step S702, the process proceeds to step S705. If an affirmative determination is made in step S702, it means that the place of transfer of the item is a place other than the place at which the vehicle 100 equipped with the item is located and the vehicle 100 is to move to the place of transfer. If a negative determination is made in step S702, it means that the place of transfer of the item is the place at which the vehicle 100 equipped with the item is located and the vehicle 100 that has made the request will come to the vehicle 100.

In step S703, the operation plan control unit 1031 creates an operation plan. The operation control unit 1031 creates as an operation plan a route to the place of transfer of the item on the basis of the information included in the operation command. The route may be created using any known technology. The operation plan also specifies a task to be done at the place of transfer, that is, the task of transferring the item to the vehicle 100 to which the item is to be transferred. In step S704, the operation plan control unit 1031 starts the operation based on the operation plan created as above.

In step S705, the operation plan control unit 1031 determines whether or not the vehicle 100 has arrived at the place of transfer. If an affirmative determination is made in step S705, the process proceeds to step S706. If a negative determination is made in step S705, the processing of step S705 is executed again. At the place of transfer, transfer of the item in question from the vehicle 100 to the vehicle 100 that has made the item addition request is carried out by, for example, the usage user who is on board the vehicle 100 that has made the item addition request. After the completion of transfer, a notice of completion of transfer is input to the vehicle 100 through the input-output unit 106 by, for example, the usage user of the vehicle 100 that has made the request. When the notice of completion of transfer is input, the operation plan control unit 1031 accesses the item equipment information table (FIG. 7) to change the equipment status field associated with the identification information of the item in question to "returned". The transfer of the item in question from the vehicle 100 to the vehicle 100 that has made the request may be carried out by, for example, a machine provided in either one of the vehicles 100. The completion of transfer may be detected by a camera or a sensor, such as a weight sensor, provided in the vehicle 100.

In step S706, the operation control unit 1031 determines whether or not transfer of the item requested by the transfer request has been completed. Step S706 is answered in the affirmative if, for example, the equipment status field associated with the identification information of the item in question in the item equipment information table (FIG. 7) indicated "returned". If an affirmative determination is made in step S706, the process illustrated in FIG. 14 is ended. If a negative determination is made in step S706, the processing of step S706 is executed again.

Note that the item transfer control process illustrated in FIG. 14 is executed, for example, as an interrupt. In the system according to the first embodiment, a vehicle 100 that can transfer an item loaded thereon to another vehicle 100 is a vehicle 100 that has completed its transportation service. Therefore, there is a possibility that the vehicle 100 may be on its way to the return position, in other words, there is a possibility that the vehicle 100 is executing the item return control process illustrated in FIG. 12. In cases where an interrupt of the item return control process occurs while the return control process is performed, the return control process is resumed after the end of the item transfer control process. If the position of the vehicle 100 changes across the item transfer control process, the process proceeds from the creation of an operation plan again, and the vehicle 100 moves for the return place.

Concrete Example

Figure 15:
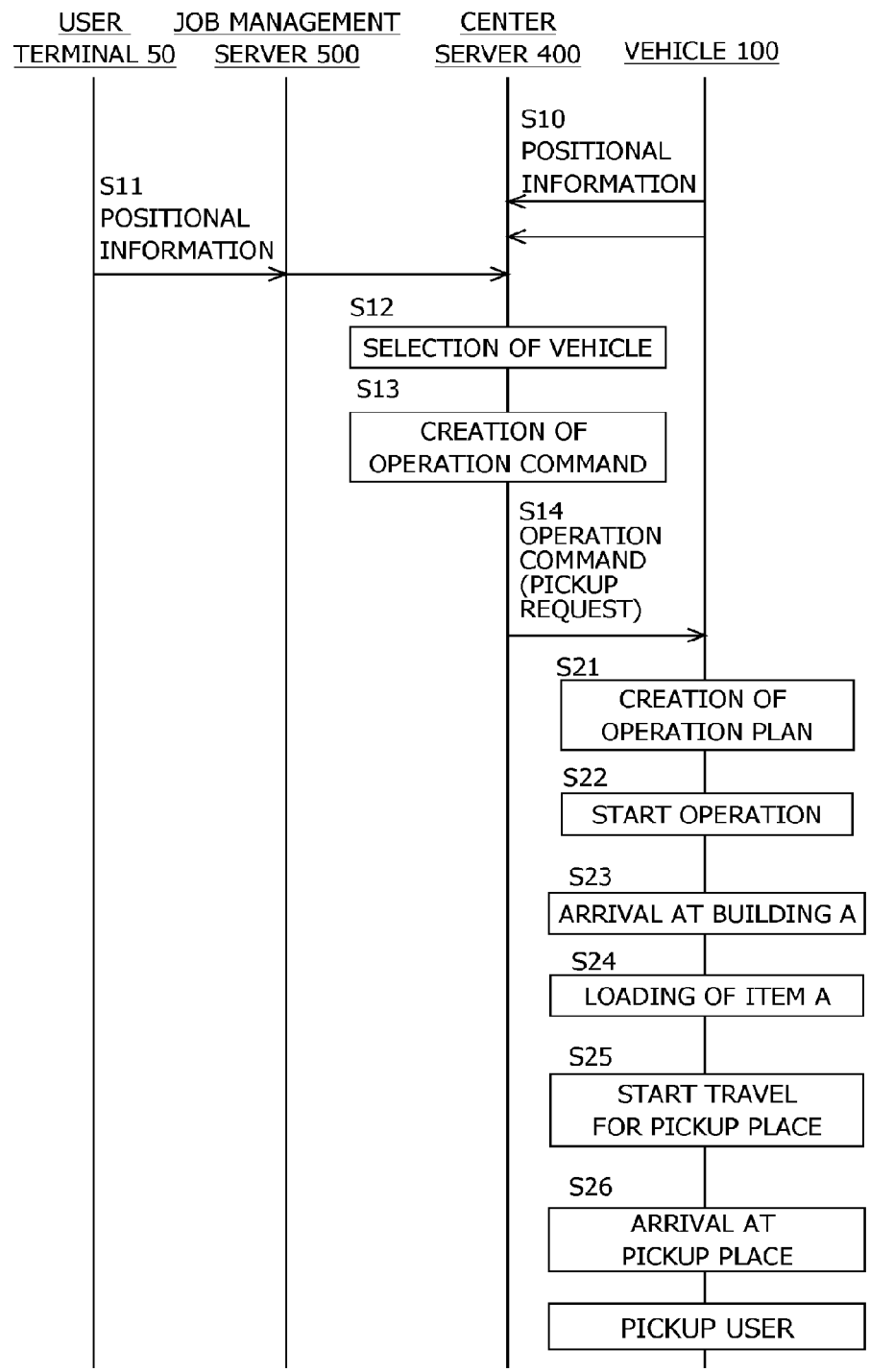
FIG. 15 is a diagram illustrating an exemplary sequential process in a case where the vehicle is dispatched to a pickup place.

FIG. 15 is a diagram illustrating an exemplary sequential process in a case where a vehicle 100 is dispatched to a pickup place. In step S10, the vehicle 100 sends position information to the center server 400 periodically. The center server 400 inputs the received current position information to the current position field associated with that vehicle 100 in the vehicle management information table (FIG. 3) in the vehicle management database 403. The vehicle 100 continues to periodically send position information also through the subsequent course of the process, though that processing is not illustrated in FIG. 15.

In step S11, a request for use is input to a user terminal 50, and the user terminal 50 sends a request for use to request dispatch of a vehicle 100 to the center server 400 through the job management server 500. The user terminal 50 also sends the identification information of the usage user who wants to get on the vehicle 100 together with the request for use.

In step S12, the center server 400 receives the request for use from the user terminal 50 through the job management server 500 (YES in S101, FIG. 8). Then, there is a vehicle that is not operating (YES in S102, FIG. 8), and the center server 400 selects a vehicle 100 provided with initial equipment suitable for the section and the job type of the usage user as the dispatched vehicle (S103, FIG. 8). Here, it is assumed that item A is stored in the additional item field associated with the section and the job type of the usage user in the equipment setting table (FIG. 6) (YES in S104, FIG. 8). In the illustrative case illustrated in FIG. 15, it is assumed that the location of the item A is a building A that is the return place, and the item A is available (YES in S105, FIG. 8).

In step S13, the center server 400 creates an operation command (S106, FIG. 8). The operation command includes information about pickup place as the destination, information about the building A (the return place of the item A) as a stopover place, and information about the item A as an additional item to be added at the stopover place. In step S14, the center server 400 sends the operation command and a pickup request to the vehicle 100 selected as the dispatched vehicle (S107, FIG. 8). In the following, the vehicle 100 will refer to the vehicle 100 selected as the dispatched vehicle.

In step S21, the vehicle 100 receives the operation command and the pickup request from the center server 400 (YES in S401, FIG. 11) and creates an operation plan on the basis of the operation command (S402, FIG. 11). The operation plan specifies, for example, a route to the pickup place as the destination via the building A as the stopover place and the task of loading the item A at the building A as the stopover place. In step S22, the vehicle 100 starts the operation in accordance with the operation plan (S402, FIG. 11).

In step S23, the vehicle 100 arrives at the building A as the stopover place. In step S24, the item A is loaded onto the vehicle 100. In step S25, after all the items to be loaded onto the vehicle 100 have been loaded (YES in S404 and S405, FIG. 11), the vehicle 100 starts to move for the pickup place (S406, FIG. 11). In step S26, the vehicle 100 arrives at the pickup place (S407, FIG. 11), and the usage user gets on the vehicle 100.

The vehicle 100 coming to the usage user in step S26 is a customized vehicle that is provided with the initial equipment and the item suitable for the section and the job type of the usage user. In consequence, the usage user can start a desired work immediately after he or she gets on the vehicle 100, making good use of the time spent until the vehicle 100 arrives at a destination designated by the usage user.

FIG. 16 is a diagram illustrating an exemplary sequential process in a case where a request for addition of an item is made in a vehicle 100. In the process illustrated in FIG. 16 also, the vehicle 100 periodically sends position information, though that processing is not illustrated in FIG. 16. A vehicle 100A relevant to the illustrative process illustrates in FIG. 16 is a vehicle that is currently operating in transportation service with a usage user aboard. A vehicle 100B relevant to the illustrative process illustrates in FIG. 16 is a vehicle with no usage user aboard that is not currently operating. Let us assume that the vehicle 100B is provided with item B and moving for the return place of the item B.

In step S31, the usage user on the vehicle 100A inputs a request for addition of the item B to the vehicle 100A (S601, FIG. 13). Let us assume that the vehicle 100A is parked at a certain place. In step S32, the vehicle 100A sends a request for addition of the item B to the center server 400 (S602, FIG. 13).

In step S33, the center server 400 receives the request for addition of the item B from the vehicle 100A (YES in S201, FIG. 9) and determines the vehicle 100B as the location of the item B (S202 and YES in S203, FIG. 9). Since the vehicle 100B is not currently operating in transportation service (NO in S205, FIG. 9), the vehicle 100B is determined as the vehicle from which the item B is to be transferred.

In step S34, the center server 400 executes the processing of determining the place of transfer of the item B (S208, FIG. 9). Here, let us assume that the current position of the vehicle 100A is determined as the place of transfer (YES in S209, FIG. 9). Then, the vehicle 100B is to move to the place at which the vehicle 100A is located, where transfer of the item B is to be carried out.

In step S35, the center server 400 sends item transfer information to the vehicle 100A. The item transfer information includes, for example, the identification information of the item B, the identification information of the vehicle 100B from which the item B is to be transferred, and information about the current position of the vehicle 100A as the place of transfer. The vehicle 100A receives the item transfer information from the center server 400 (S603, FIG. 13), but does not receive an operation command (NO in S604, FIG. 13). Consequently, the vehicle 100A waits for the arrival of the vehicle 100B.

In step S36, the center server 400 sends an operation command and a transfer request to the vehicle 100B (S210, FIG. 9). The operation command sent to the vehicle 100B in step S36 includes, for example, a designation of the current position of the vehicle 100A as the destination. The transfer request includes, for example, the identification information of the item B to be transferred, the identification information of the vehicle 100A to which the item is to be transferred, and information about the current position of the vehicle 100A as the place of transfer.

In step S41, the vehicle 100B receives the transfer request and the operation command from the center server 400 (YES in S701 and S702, FIG. 14) and creates an operation plan to the current position of the vehicle 100A as the place of transfer (S703, FIG. 14). In step S42, the vehicle 100B starts to travel to the vehicle 100A (S704, FIG. 14).

In step S43, the vehicle 100B arrives at the place where the vehicle 100A is located, that is, the place of transfer (S705, FIG. 14). In step S44, the item B is transferred from the vehicle 100B to the vehicle 100A. In step S45, a notice of completion of transfer is input to the vehicle 100B by, for example, the usage user of the vehicle 100A (YES in S707, FIG. 14). In step S46, a notice of completion of loading of the item B is input to the vehicle 100A by, for example, the usage user of the vehicle 100A (YES in S607, FIG. 13).

In step S47, the vehicle 100A sends a notice of completion of loading of the item B to the center server 400 (S608, FIG. 13). Then, the center server 400 updates the location of the item B.

Operation and Effects of First Embodiment

In the system according to the first embodiment, when the center server 400 receives a request for use, it sends to an autonomously movable vehicle 100 an operation command that designates a pickup place as the destination and the location of an additional item as a stopover place. The vehicle 100 stops over at the location of the additional item and then, after the completion of loading of the additional item, starts to move for the pickup place as the destination. Thus, at the time when the vehicle 100 arrives at the pickup place, the vehicle 100 is provided with equipment that has already been customized for usage user's convenience with the provision of the additional item. Consequently, a usage user who gets on that vehicle 100 can conduct a desired work immediately after getting on the vehicle 100. This increases the user convenience of the mobile object system.

In the system according to the first embodiment, the center server 400 selects a vehicle 100 that is provided with initial equipment that matches attributes of the usage user as the vehicle to be dispatched to the pickup place. Moreover, if, for example, a plurality of vehicles 100 provided with different sets of equipment respectively matching the types of attributes of usage users is prepared in advance, the effort and time of customizing the equipment of a vehicle 100 can be eliminated, leading to a reduction in the time taken to deliver the vehicle to the destination.

In the system according to the first embodiment, when the center server 400 receives from a vehicle 100 a request for addition of an item input by a usage user, the center server 400 identifies the location of the additional item and determines the place of transfer on the basis of the location of the additional item. The place of transfer is set to, for example, the location of the vehicle 100 that has made the request, the return place of the additional item, or the location of the vehicle 100 currently equipped with the additional item. The center server 400 sends an operation command(s) to either or both of the vehicle 100 that has made the request and the vehicle 100 currently equipped with the additional item according to the place of transfer. Thus, the vehicle 100 can be customized in response to the request made by the usage user aboard the vehicle 100. In cases where the additional item is currently loaded on a certain vehicle 100, the item may be transferred between the vehicles 100. This spares both the vehicle 100 that has made the request and the vehicle 100 currently equipped with the additional item the trouble of traveling to the return place of the additional item.

In the system according to the first embodiment, the center server 400 sends to a vehicle 100 that has completed its transportation service an operation command designating its return place as the destination so as to return the vehicle 100 to its return place. In cases where the vehicle 100 is equipped with an additional item, the operation command includes a designation of the return place of the additional item as a stopover place. Consequently, the vehicle 100 that has completed its transportation service unloads the additional item at the return place of the additional item on the way to its return place and returns to the return place in the initial state. When performing transportation service next time, the vehicle 100 may be equipped with other items to meet requirement of another usage user. Thus, the vehicle 100 can have enhanced versatility. The place at which an item is loaded on a vehicle 100 and the return place of that item are not necessarily the same. For example, in cases where the item is transferred to the vehicle 100 from another vehicle 100 at a place of transfer different from the return place of that item, the place at which the item is loaded on a vehicle 100 and the return place of the item are different.

<Others>

In the first embodiment, a case in which the mobile object service is implemented under the management of one business entity, namely only within that business entity in a limited way. However, the mobile object service can be implemented in a general way. In a mode in which the mobile object service is implemented in a general way, for example, a personal user sends a request for use directly to the center server 400 through a smartphone, a personal computer or the like, and a vehicle 100 is dispatched to a pickup place designated by that personal user. The vehicle 100 is provided with, for example, initial equipment that is adapted to the purpose of use (e.g. camping, cinema appreciation, etc.), and the center server 400 obtains information about attributes of the personal user beforehand with the request for use and determines additional items that meet the needs of the personal user to equip the vehicle 100 with them before dispatching. Thus, the vehicle 100 can be adapted to various circumstances. The information about attributes of personal users includes, for example, the age, sex, interest, and taste.

In the system according to the first embodiment, when a request for addition of an item is input to a vehicle 100 by the usage user aboard, the vehicle 100 sends an addition request to the center server 400, and the center server 400 searches for the location of the additional item and determines the place of transfer. However, the mobile object system is not limited to this. When a request for addition of an item is input to a vehicle 100 by the usage user aboard, the vehicle 100 may detect another vehicle 100 equipped with the additional item present in the neighborhood using inter-vehicle communication. If a vehicle 100 equipped with the additional item is detected, the vehicle 100 may determine a place of transfer of the additional item, sends an operation command to the vehicle 100 equipped with the additional item to cause it to move to the place of transfer, and create an operation plan to the place of transfer to move to the place of transfer. In the case where another vehicle 100 equipped with the additional item that is present in the neighborhood cannot be detected by inter-vehicle communication, the vehicle 100 may send an addition request to the center server 400.

<Storage Medium>

A program that causes a computer, machine, or other apparatus (which will be hereinafter referred to as a computer or the like) to implement the above-described control may be stored in a storage medium that can be read by a computer or the like. The computer or the like may be caused to read the program stored in the storage medium and execute it to function as the above-described center server 400.

The storage medium that can be read by a computer or the like refers to a non-transitory storage medium that can store information such as data and programs by an electrical, magnetic, optical, mechanical, or chemical effect in a manner readable by a computer or the like. Examples of such storage medium that is removable from a computer or the like include a flexible disc, a magneto-optical disc, a CD-ROM, a CD-R/W, a DVD, a Blu-ray disc, a DAT, a 8 mm tape, and a memory card, such a flash memory. Examples of such a medium that is fixed to a computer or the like include a hard disc, and a ROM (Read Only Memory). An SSD (Solid State Drive) can be used as either a storage medium removable from a computer or the like or a storage medium fixed to a computer or the like.

What is claimed is:

1. A mobile object system that dispatches a vehicle configured to move autonomously to a destination at which a user is located, comprising:
   a controller comprising at least one processor configured to:
      receive a request from the user for use of a vehicle configured to move autonomously;
      determine a first vehicle to be dispatched to the user based on an attribute of the user, the first vehicle configured to move autonomously and to load at least one part of first equipment including one or more parts; and
      send to the first vehicle a first command to move autonomously to a first destination via one or more stopover places where at least one of the one or more parts of the first equipment is present,
   wherein
   the at least one of the one or more parts of the first equipment is loaded on the first vehicle when the first vehicle arrives at each of the one or more stopover places, and
   the first vehicle moves autonomously, in accordance with the first command, to the first destination when all parts of the first equipment are loaded on the first vehicle in accordance with the request.

2. The mobile object system according to claim 1, wherein:
   the mobile object system comprises a plurality of vehicles configured to move autonomously and to load predetermined equipment, and
   the at least one processor is configured to select the first vehicle of the plurality of vehicles to load a first part of the first equipment and send the first command to move autonomously to the first destination via the one or more stopover places to the first vehicle so that the remaining parts of the first equipment other than the first part is loaded onto the first vehicle at the one or more stopover places.

3. The mobile object system according to claim 1, wherein the at least one processor is configured to:
   search for a second vehicle configured to move autonomously that is to load second equipment that is to be loaded onto the first vehicle configured to move autonomously;
   determine a place of transfer of the second equipment in a predetermined area including at least a current position of the first vehicle and a current position of the second vehicle; and
   send a command to move autonomously to the place of transfer of the second equipment to both or either one of the first vehicle and the second vehicle.

4. The mobile object system according to claim 1, wherein:
   after end of use of the first vehicle loading the first equipment by the user, the at least one processor is configured to send a second command designating a place of return of the first equipment as a second stopover place and a designation of a place of return of the first vehicle as a second destination, and the first vehicle moves autonomously, in accordance with the second command, from the second stopover place to the second destination after returning of the at least one of the one or more parts of the first equipment at the second stopover place is completed.

5. A control method for a mobile object system that dispatches a vehicle configured to move autonomously to a destination at which a user is located, comprising:
   receiving a request for use of a vehicle configured to move autonomously from the user;
   determining a first vehicle to be dispatched to the user based on an attribute of the user, the first vehicle configured to move autonomously and to load at least one part of first equipment including one or more parts;
   sending to the first vehicle a command to move autonomously to the destination via one or more stopover places where at least one of the one or more parts of the first equipment is present; and
   causing the vehicle to be loaded with at least one of the one or more parts of the first equipment when the first vehicle arrives at each of the one or more stopover places, and move autonomously, in accordance with the command, to the destination when all parts of the first equipment are loaded on the first vehicle in accordance with the request.

6. The control method for a mobile object system according to claim 5, wherein:
   the mobile object system includes a plurality of vehicles configured to move autonomously and to load predetermined equipment, and the method further comprising:
   selecting the first vehicle of the plurality of vehicles to load a first part of the first equipment; and
   sending the command to move autonomously to the destination via the one or more stopover places to the first vehicle so that the remaining part of the first equipment other than the first part is loaded onto the first vehicle at the one or more stopover places.

7. The mobile object system according to claim 1, wherein:
   when, there is no vehicle which is not operating in user transportation service, the at least one processor is configured to send a notice that a vehicle cannot be dispatched to the user.

* * * * *